US010695723B2

(12) United States Patent
Varanasi et al.

(10) Patent No.: US 10,695,723 B2
(45) Date of Patent: Jun. 30, 2020

(54) DYE SENSITIZED PHOTOACTIVE SURFACES

(71) Applicant: Massachusetts Institute of Technology, Cambridge, MA (US)

(72) Inventors: Kripa K. Varanasi, Lexington, MA (US); Gareth H. McKinley, Acton, MA (US); Gibum Kwon, Waltham, MA (US); Mohammad Ashraf Gondal, Dhahran (SA)

(73) Assignee: MASSACHUSETTS INSTITUTE OF TECHNOLOGY, Cambridge, MA (US)

(*) Notice: Subject to any disclaimer, the term of this patent is extended or adjusted under 35 U.S.C. 154(b) by 0 days.

(21) Appl. No.: 15/186,524

(22) Filed: Jun. 19, 2016

(65) Prior Publication Data

US 2016/0367946 A1    Dec. 22, 2016

Related U.S. Application Data

(60) Provisional application No. 62/181,833, filed on Jun. 19, 2015.

(51) Int. Cl.
| B01D 67/00 | (2006.01) |
| B01D 69/02 | (2006.01) |
| B01D 17/02 | (2006.01) |
| B01D 17/04 | (2006.01) |
| B01D 17/00 | (2006.01) |
| B01D 61/00 | (2006.01) |

(52) U.S. Cl.
CPC ........ B01D 67/0088 (2013.01); B01D 17/02 (2013.01); B01D 17/045 (2013.01); B01D 17/085 (2013.01); B01D 61/00 (2013.01); B01D 69/02 (2013.01); B01D 2325/44 (2013.01); Y02E 10/542 (2013.01)

(58) Field of Classification Search
None
See application file for complete search history.

(56) References Cited

U.S. PATENT DOCUMENTS

| 8,446,666 | B2 | 5/2013 | Kurt et al. |
| 9,082,700 | B2 | 7/2015 | Vail et al. |
| 9,708,199 | B2 | 7/2017 | Zhang et al. |
| 2004/0133193 | A1 | 7/2004 | Bearinger et al. |
| 2008/0072960 | A1 | 3/2008 | Kim et al. |
| 2010/0290109 | A1 | 11/2010 | Kurt et al. |
| 2012/0267240 | A1* | 10/2012 | Ke ................ C25B 1/003 204/242 |
| 2013/0122723 | A1 | 5/2013 | Vail et al. |
| 2013/0264287 | A1 | 10/2013 | Zhang et al. |

OTHER PUBLICATIONS

Notification Concerning Transmittal of International Preliminary Report on Patentability (Chapter I of the Patent Cooperation Treaty), dated Dec. 28, 2017, issued in International Application No. PCT/US2016/038278.

(Continued)

*Primary Examiner* — Krishnan S Menon
(74) *Attorney, Agent, or Firm* — Steptoe & Johnson LLP

(57) ABSTRACT

Upon light irradiation, a dye sensitized photoactive surfaces can undergo hydrophobic to hydrophilic conversion in both in air and oil environments.

19 Claims, 26 Drawing Sheets

(56) References Cited

OTHER PUBLICATIONS

International Search Report dated Sep. 28, 2016, issued in International Application No. PCT/US2016/038278.
Written Opinion of the International Searching Authority dated Sep. 28, 2016, issued in International Application No. PCT/US2016/038278.
Notification of Transmittal of the International Search Report and the Written Opinion of the International Searching Authority, or the Declaration dated Sep. 28, 2016, issued in International Application No. PCT/US2016/038278.
Caputo et al., Reversible Wettability Changes in Colloidal TiO2 Nanorod Thin-Film Coatings under Selective UV Laser Irradiation, J. Phys. Chem. C, 2008, 112, pp. 701-714, abstract; p. 702, col. 2, para 4.

\* cited by examiner

DYE SENSITIZED PHOTOACTIVE SURFACES

CLAIM OF PRIORITY

This application claims the benefit of prior U.S. Provisional Application No. 62/181,833 filed on Jun. 19, 2015, which is incorporated by reference in its entirety.

TECHNICAL FIELD

This invention relates to photoactive surfaces.

BACKGROUND

Controlling and/or modifying the wettability of solid surfaces has attracted significant attraction due to a wide range of potential applications, including separation, microfluidic and lab-on-a-chip devices, controllable drug delivery, self-cleaning, antibacterial and antibiofouling. For these applications, it is particularly desirable to dynamically manipulate the behaviors of the contacting liquid on the surfaces, including the contact angles, droplet motion and effective area of the solid-liquid interface.

Photoactive materials such as titanium dioxide ($TiO_2$) have attracted significant attention due to their ability to switch wettability upon irradiation of UV light. However, the large band gap limits their ability to absorb visible light or sunlight effectively. Although doping has been demonstrated as an effective solution to enhance the visible light-induced wettability switching of photoactive materials, typically it demands harsh conditions including high temperature, high pressure or toxic chemical environments, which limits versatility in fabrication process.

Stimuli-responsive surfaces that can switch wettability towards liquids upon the application of an external stimuli have been extensively fabricated. Typically such surfaces are reversibly switched from hydrophobicity (contact angle for water, $\theta_{water} > 90°$) or superhydrophobocity ($\theta_{water} > 150°$) to hydrophilicity ($0° < \theta_{water} < 90°$ or superhydrophlicity ($\theta_{water} = 0°$). In order to induce wettability switching, various external stimuli have been employed including pH, electric potential, chemical composition, solvent environment. Among numerous stimuli-responsive materials, photoactive materials, mainly of $TiO_2$ and ZnO, are widely studied due to their ability to switch wettability from hydrophobicity to hydrophilicity upon alternation of ultraviolet (UV) irradiation and storage in dark. Recently it was revealed that hierarchical roughness on the photoactive surfaces consisting of micro- and nanostructures cause amplification of contact angle changes. Such a unique photo-induced switchable wettability of photoactive materials has attracted wide scientific attention for both fundamental research and practical applications in antibacteria, antifogging, self-cleaning, biomedical, device, fluid transportation, liquid separation, anticorrosion, offset printing, site-selective functional printing, water condensation, as well as agricultural and environmental fields.

SUMMARY

A surface of a solid-liquid interface, the surface modified with a composition can include a matrix including a plurality of particles, where a surface of the particles is modified with a photosensitizer, where the wettability of the surface changes upon irradiation with light.

In certain embodiments, the plurality of particles can include a metal oxide.

In certain embodiments, the metal oxide can include $TiO_2$, ZnO, $WO_3$, $SrTiO_3$, $SnO_2$, $V_2O_5$, $CeO_2$, CuO, $MoO_3$, $Fe_2O_3$, $Cr_2O_3$ or $In_2O_3$.

In certain embodiments, the particle can be a nanoparticle.

In certain embodiments, the matrix can include a multilayer including a first layer including a polyelectrolyte polymer and a second layer including the plurality of particles in contact with the first layer.

In certain embodiments, the polyelectrolyte polymer can include poly(allylamine hydrochloride).

In certain embodiments, the photosensitizer can include Chlorin.

In certain embodiments, the photosensitizer can include a Ruthenium (II) polypyridyl complex.

In certain embodiments, the photosensitizer can be N3, D149, Chlorin, Coumarin 343, Eosin Y, N719, N621, N179, N749, N945, Z907, Z907-Na, Z910, Z675, Z646, Z991, K8, K19, K20, K51, K60, K68, K73, K77, D5, D6, D102, D205, D29, D35, D37, DPP07, DPP13, DPP14, DPP15, DPP17, A1, A2, A3, A597, C101, C102, C217, CYC-B1, CYC-B3, CYC-B11, YS-1, YS-2, YS-3, YS-4, YS-5, YE05, Y123, YD2, YD2-o-C8, T18, T66, TFRS-1, TFRS-2, TFRS-3, HRS-1, SJW-E1, S8, JK-91, JK-92, LI17, HY2, DX1, SM371, SM315, RK1, NKX-2569, MB18-N, LEG4, DEK1, B18, D45, D51, D77, C106, N820, N823, N886, K9, N712, NKK-2553, NKK-2554, TG6, JF419, MKA253, L1, MK245, HSQ4, or P1.

In certain embodiments, the particles can be covalently bonded to the photosensitizer.

In certain embodiments, the solid can include glass, fiber, stainless steel, inorganic materials or sand.

In certain embodiments, the solid can be coated with indium tin oxide.

An oil-water separation device can include a membrane includin the surface described above.

A method of separating oil from water in an oil-water mixture can include contacting a surface of an oil-water separation device with the oil-water mixture, the surface, the surface modified with a composition comprising a matrix including a plurality of particles, where a surface of the particles are modified with a photosensitizer, where the wettability of the surface changes upon irradiation with light and irradiating the surface with light.

In certain embodiments, the plurality of particles can include a metal oxide.

In certain embodiments, the metal oxide can include $TiO_2$, ZnO, $WO_3$, $SrTiO_3$, $SnO_2$, $V_2O_5$, $CeO_2$, CuO, $MoO_3$, $Fe_2O_3$, $Cr_2O_3$ or $In_2O_3$.

In certain embodiments, the photosensitizer can include Chlorin.

In certain embodiments, the photosensitizer can include a Ruthenium (II) polypyridyl complex.

A method of coating a surface of an oil-water separating device can include depositing a matrix including a plurality of particles on the surface, where a surface of the particles are modified with a photosensitizer, where the wettability of the surface changes upon irradiation with light.

In certain embodiments, the plurality of particles can include a metal oxide.

Other aspects, embodiments, and features will be apparent from the following description, the drawings, and the claims.

BRIEF DESCRIPTION OF THE DRAWINGS

FIG. 6A shows visible light absorption data of an N3-sensitized $TiO_2$ surface. Corresponding absorption data for an unsensitized neat $TiO_2$ surface is also shown for comparison. Insets: (i) A scanning electron microscopic (SEM) image of a nanostructured $TiO_2$ surface. (ii) A photograph of an N3 dye-sensitized $TiO_2$ surface. FIG. 6B shows evolution in the measured equilibrium contact angles for potassium iodide (KI, 10 wt % in water), deionized (DI) water and potassium chloride (KCl, 10 wt % in water) on an N3 dye-sensitized $TiO_2$ surface as a function of illumination time (Intensity=145 $mW/cm^2$). Inset: A schematic of in situ contact angle measurement of an aqueous droplet on a dye-sensitized $TiO_2$ surface submerged in dodecane under visible-light illumination. FIG. 6C shows a plot of evolution in contact angles for multiple wetting cycles of KI and KCl droplets on an N3 dye-sensitized $TiO_2$ surface under visible-light illumination.

FIG. 7A shows schematic illustration and relative energy state diagram of an N3 dye-sensitized $TiO_2$ surface contacting either KI or KCl droplet. FIG. 7B shows a plot of measured voltages (symbols) and fit (lines; equation (1)) across the contacting liquids (KI or KCl) and the N3 dye-sensitized $TiO_2$ surface under visible light illumination (Intensity=145 $mW/cm^2$). Inset: A zoomed-in image showing voltages immediately after the onset of visible-light illumination. FIG. 7C shows evolution in the measured contact angles for KI and KCl droplets on the electrically-grounded N3 dye-sensitized $TiO_2$ surface. Inset: A schematic illustration of in situ contact angle measurement of a droplet on the electrically-grounded dye-sensitized $TiO_2$ surface.

FIG. 8A shows an energy diagram of various dyes (N3, D149 and Chlorin) and 10 wt % ionic aqueous solutions (potassium thiosulfate ($K_2S_2O_3$), KI, potassium bromide (KBr) and KCl). FIGS. 8B and 8C show evolution in the measured contact angles for 10 wt % ionic aqueous $K_2S_2O_3$, KI, KBr and KCl droplets on a D149 dye-sensitized $TiO_2$ surface and on a Chlorin dye-sensitized $TiO_2$ surface submerged in dodecane, respectively, as a function of illumination time.

FIG. 9A (i)-(iii) show a sequence of images showing visible-light-guided movement of a droplet of sodium chloride (NaCl, 10 wt % in water) on a patterned Chlorin dye-sensitized $TiO_2$ surface. FIG. 9A (iv)-(vi) show sequential images captured from contact angle goniometry of anisotropic wetting of an NaCl droplet (9 μl) upon focused visible-light illumination. FIG. 9B shows sequential images of photo-induced coalescence of multiple NaCl droplets placed on a Chlorin dye-sensitized $TiO_2$ surface submerged in dodecane. FIG. 9C shows a demulsification apparatus with a 30:70 v:v Span80 (0.1 wt %)-stabilized brine (10 wt % NaCl in water)-in-dodecane emulsion above the membrane coated with Chlorin dye-sensitized $TiO_2$ film. FIG. 9D shows brine droplets contacting the membrane surface coalesce upon visible light illumination resulting in spontaneous demulsification and gravity separation. FIG. 9E shows measured number size distribution of brine droplets for the feed emulsion.

DETAILED DESCRIPTION

Figure 1:
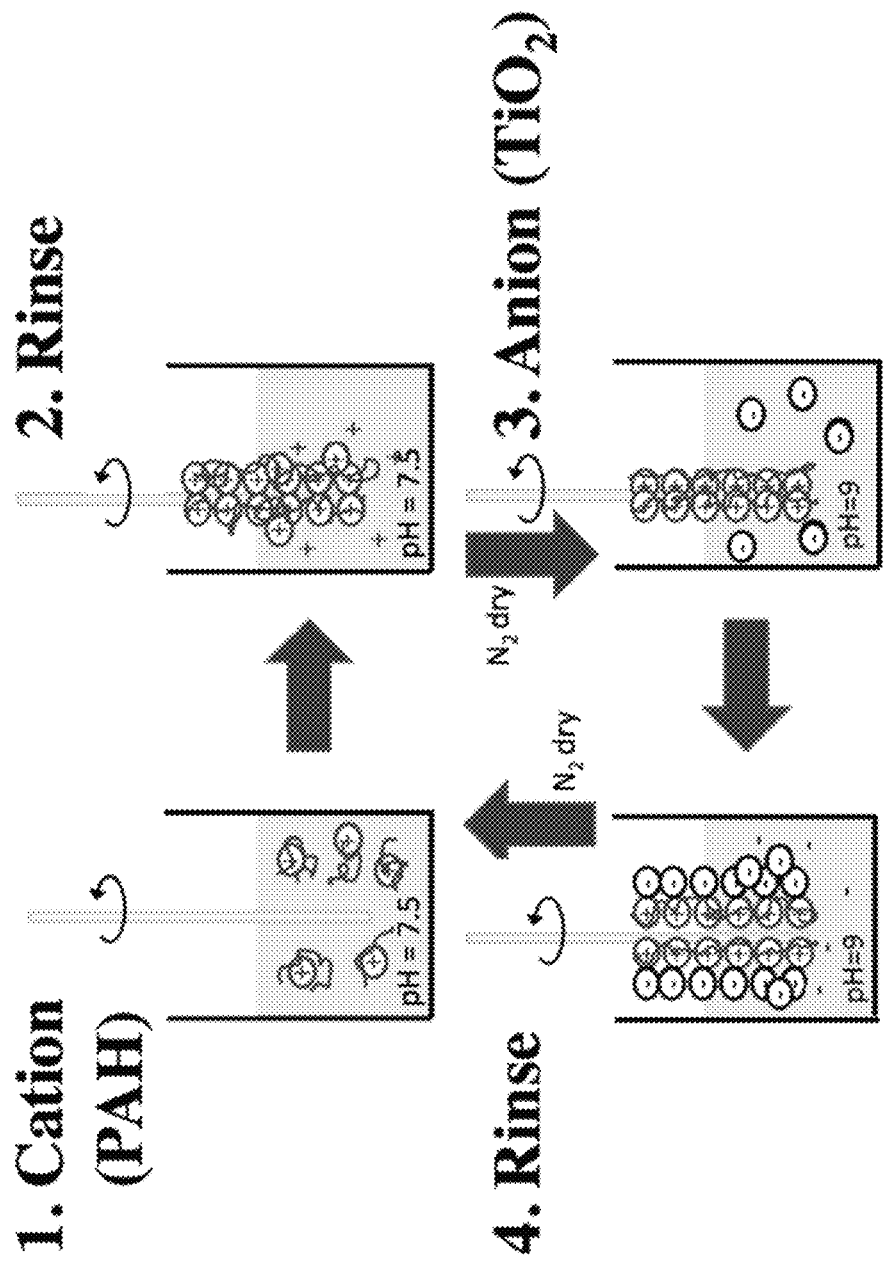
FIG. 1 shows a schematic illustration of the deposition of a single bilayer of ($PAH/TiO_2$) during the Layer-by-layer deposition process.

Disclosed herein a method and a system to switch the wettability of photoactive materials to be responsive in the visible spectral regime using dye sensitization. A surface of a solid-liquid interface modified with a composition can include a matrix including a plurality of particles, where a surface of the particles is modified with a photosensitizer, where the wettability of the surface changes upon irradiation with light. The matrix can include a polymer or inorganic matrix. For example, the matrix can be a polymer film. In certain embodiments, the polymer film can be a multilayer film. The matrix can be deposited on a surface by a variety of different methods, for example, spray coating, dip coating, stamping, spin coating, ink jet printing, or layer-by-layer deposition. A photosensitizer can be selected to target a particular spectral range of light (e.g. UV or visible light). The particles can be micron-sized particles or nanoparticles. In certain embodiments, upon visible light irradiation, dye sensitized photoactive surfaces underwent hydrophobic to hydrophilic conversion in both in air and oil environments. In certain embodiments, a dye-sensitized $TiO_2$ surface can also be engineered utilizing a facile dip-coating-based method to selectively switch its wettability state towards contacting liquids upon visible light illumination. This wettability change arises due to the electric potential difference established between the surface and the liquid upon incident illumination. A systematic study of the relationship between the energy levels of the dye and the contacting liquid reveals that the HOMO (highest occupied molecular orbital) energy level of the dye and the reduction potential of the liquid govern the ensuing wetting behaviors. Utilizing this photo-electro-wettability change of the dye-sensitized $TiO_2$ surface, light-guided manipulation of liquid droplet motion was demonstrated along the surface. Further demulsification of surfactant-stabilized brine-in-oil emulsion is shown via interfacial coalescence of brine droplets under visible light illumination. Such surfaces thus offer a wide range of potential applications including optically driven, microfluidic devices with customizable wettability and continuous solar-driven self-cleaning and oil-water separation technologies.

Photo-responsive titania ($TiO_2$) surfaces are of great interest due to their unique responsive wettability change upon ultraviolet (UV) light. See, Wang, R. et al. Light-induced amphiphilic surfaces. *Nature* 388, 431-432, doi:Doi 10.1038/41233 (1997), Wang, R. et al. Photogeneration of highly amphiphilic TiO2 surfaces. *Adv Mater* 10, 135-138, doi:Doi 10.1002/(Sici)1521-4095(199801)10:2<135::Aid-Adma135>3.0.Co; 2-M (1998), Watanabe, T. et al. Photocatalytic activity and photoinduced hydrophilicity of titanium dioxide coated glass. *Thin Solid Films* 351, 260-263, doi:Doi 10.1016/S0040-6090(99)00205-9 (1999), and Liu, K. S., Cao, M. Y., Fujishima, A. & Jiang, L. Bio-Inspired Titanium Dioxide Materials with Special Wettability and Their Applications. *Chem Rev* 114, 10044-10094, doi: 10.1021/cr4006796 (2014), each of which is incorporated by reference in its entirety. However, their applications are often limited either by the inability to respond to the visible-light spectrum of natural sunlight or by the slow kinetics and special environment (i.e., storage in dark or heat) required to recover the original wettability state. See, Hashimoto, K., Irie, H. & Fujishima, A. TiO2 photocatalysis: A historical overview and future prospects. *Jpn J Appl Phys 1* 44, 8269-8285, doi:10.1143/JJAP.44.8269 (2005), Irie, H., Washizuka, S., Yoshino, N. & Hashimoto, K. Visible-light induced hydrophilicity on nitrogen-substituted titanium dioxide films. *Chem Commun*, 1298-1299, doi: 10.1039/b302975a (2003), Wang, R., Sakai, N., Fujishima, A., Watanabe, T. & Hashimoto, K. Studies of surface wettability conversion on TiO2 single-crystal surfaces. *J Phys Chem B* 103, 2188-2194, doi:Doi 10.1021/Jp983386x (1999), and Sakai, N., Fujishima, A., Watanabe, T. & Hashimoto, K. Quantitative evaluation of the photoinduced hydrophilic conversion properties of TiO2 thin film surfaces by the reciprocal of contact angle. *J Phys Chem B* 107, 1028-1035, doi:10.1021/jp022105p (2003), each of which is incorporated by reference in its entirety. The strategy of sensitizing $TiO_2$ surfaces with dopants and visible light absorbing materials (e.g., organic dyes) has been utilized in photovoltaics to efficiently absorb solar radiation and convert it to electrical energy. See, Oregan, B. & Gratzel, M. A Low-Cost, High-Efficiency Solar-Cell Based on Dye-Sensitized Colloidal Tio2 Films. *Nature* 353, 737-740, doi:Doi 10.1038/353737a0 (1991), Bach, U. et al. Solid-state dye-sensitized mesoporous TiO2 solar cells with high photon-to-electron conversion efficiencies. *Nature* 395, 583-585 (1998), and Mathew, S. et al. Dye-sensitized solar cells with 13% efficiency achieved through the molecular engineering of porphyrin sensitizers. *Nat Chem* 6, 242-247, doi:10.1038/NCHEM.1861 (2014), each of which is incorporated by reference in its entirety.

Photo-driven manipulation of liquid motion on a $TiO_2$ surface is highly attractive because it would eliminate any need for either direct electrical contact with liquids or complex electronic circuitry. See, Monteleone, F. V. et al. Light-Controlled Directional Liquid Drop Movement on TiO2 Nanorods-Based Nanocomposite Photopatterns. *Langmuir* 26, 18557-18563, doi:10.1021/1a1026398 (2010), Kataoka, S. & Anderson, M. A. Capillary rise between two TiO2 thin-films: evaluating photo-activated wetting. *Thin Solid Films* 446, 232-237, doi:10.1016/j.tsf.2003.10.001 (2004), and Baigl, D. Photo-actuation of liquids for light-driven microfluidics: state of the art and perspectives. *Lab Chip* 12, 3637-3653, doi:10.1039/c21c40596b (2012), each of which is incorporated by reference in its entirety. A great deal of work has been devoted to elucidating the origin of the well-documented unique UV light-induced wettability change on $TiO_2$ surfaces. See, Sun, R. D., Nakajima, A., Fujishima, A., Watanabe, T. & Hashimoto, K. Photoinduced surface wettability conversion of ZnO and TiO2 thin films. *J Phys Chem B* 105, 1984-1990, doi:10.1021/jp002525j (2001), Sakai, N., Fujishima, A., Watanabe, T. & Hashimoto, K. Enhancement of the photoinduced hydrophilic conversion rate of TiO2 film electrode surfaces by anodic polarization. *J Phys Chem B* 105, 3023-3026, doi:Doi 10.1021/Jp003212r (2001), Ohtsu, N., Masahashi, N., Mizukoshi, Y. & Wagatsuma, K. Hydrocarbon Decomposition on a Hydrophilic TiO2 Surface by UV Irradiation: Spectral and Quantitative Analysis Using in-Situ XPS Technique. *Langmuir* 25, 11586-11591, doi:10.1021/1a901505m (2009), and Lee, K. et al. Superwetting of TiO2 by light-induced water-layer growth via delocalized surface electrons. *P Natl Acad Sci USA* 111, 5784-5789, doi:10.1073/pnas.1319001111 (2014), each of which is incorporated by reference in its entirety. Although this continues to remain an active area of research, it is widely accepted that photo-generated electrons and holes change the surface chemistry so that it is favorable for contacting liquids to spread either by photocatalytic oxidation of surface adsorbed organic species or by the increase of hydroxyl species due to dissociative water adsorption. See, Zubkov, T. et al. Ultraviolet light-induced hydrophilicity effect on $TiO_2$(110)(1×1). Dominant role of the photo-oxidation of adsorbed hydrocarbons causing wetting by water droplets. *J Phys Chem B* 109, 15454-15462, doi: 10.1021/jp058101c (2005), White, J. M., Szanyi, J. & Henderson, M. A. The photon-driven hydrophilicity of titania: A model study using TiO2(110) and adsorbed trimethyl acetate. *J Phys Chem B* 107, 9029-9033, doi:10.1021/jp0345046 (2003), Takeuchi, M., Sakamoto, K., Martra, G., Coluccia, S. & Anpo, M. Mechanism of photoinduced superhydrophilicity on the TiO2 photocatalyst surface. *J Phys Chem B* 109, 15422-15428, doi:10.1021/jp058075i (2005), and Wang, C. Y., Groenzin, H. & Shultz, M. J. Molecular species on nanoparticulate anatase $TiO_2$ film detected by sum frequency generation: Trace hydrocarbons and hydroxyl groups. *Langmuir* 19, 7330-7334, doi: 10.1021/1a0345542 (2003), each of which is incorporated by reference in its entirety.

Among various photoactive materials, titanium dioxide ($TiO_2$) is one of the most widely studied one ever since Fujishima et al. first reported the ultraviolet (UV) light-induced superhydrophilicity of $TiO_2$ surfaces. See, Wang, R. et al. Light-induced amphiphilic surfaces. *Nature* 388, 431-432, (1997), which is incorporated by reference in its entirety. In the report, $TiO_2$ surface exhibited a water contact angle around 72° before UV irradiation. After UV irradiation, a water droplet spreads completely on the surface, resulting in $\theta_{water}=0°$. They also reported that wettability change of the surfaces was reversible by alternation of UV irradiation and long-term storage in dark. After this discovery, a great deal of works has been focused on developing light-induced wettability switches on photoactive materials.

A polyelectrolyte has a backbone with a plurality of charged functional groups attached to the backbone. A polyelectrolyte can be polycationic or polyanionic. A polycation has a backbone with a plurality of positively charged functional groups attached to the backbone, for example poly(allylamine hydrochloride) (PAH). A polyanion has a backbone with a plurality of negatively charged functional groups attached to the backbone, such as sulfonated polystyrene (SPS) or poly(acrylic acid) (PAA), or a salt thereof. Some polyelectrolytes can lose their charge (i.e., become electrically neutral) depending on conditions such as pH. Some polyelectrolytes, such as copolymers, can include both polycationic segments and polyanionic segments.

The polyelectrolyte solutions can be applied in a single step, in which a mixed polymer and particle solution is applied to a substrate in a controlled manner to achieve required nano-porosity inside the coating. This approach can provide low fabrication cost and high yield. Alternatively, the polyelectrolyte solutions can be applied in a multi-step method, in which polymer layers and nano-particle layers are deposited in an alternating fashion. The multi-step approach can be more efficient for manufacturing with a spray method than an immersion-based method, because spray deposition does not require a rinse between immersions. With either method, the coating parameters such as material composition, solution concentration, solvent type, and so on, can be optimized to efficiently produce a coating with desired properties.

Layer-by-Layer (LbL) assembly technique can be used to form a multilayer to enable the uniform coating thickness with conformal thin film coatings with molecular level control over film thickness and chemistry. See, Wu, Z.; Lee, D.; Rubner, M. F.; Cohen, R. E., *Small* 2007, 3, 1445, Decher, G., *Science* 1997, 277, 1232, and Nuraje, N.; Asmatulu, R.; Cohen, R. E.; Rubner, M. F., *Langmuir* 2011, 27, 782, each of which is incorporated by reference in its entirety. Using oppositely charged polymeric solution and nanoparticle solutions, a conformal coating that is essential to reduce scattering or haze can be obtained. See, Lee, D.; Gemici, Z.; Rubner, M. F.; Cohen, R. E., *Langmuir* 2007, 23, 8833, and Shimomura, H.; Gemici, Z.; Cohen, R. E.; Rubner, M. F., *Applied Materials and Interfaces* 2010, 2, 813, each of which is incorporated by reference in its entirety. This coating method has benefits of extremely precise control of film thicknesses and uniformity even on curved surfaces, compared to other typical coating methods such as dip-coating, spray-coating, and solvent-casting.

One method of depositing the polyelectrolytes is to contact the substrate with an aqueous solution of polyelectrolyte at an appropriate pH. The pH can be chosen such that the polyelectrolyte is partially or weakly charged, or such that the polyelectrolyte is substantially completely or strongly charged. See, for example, G. Decher, Science 1997, 277, 1232; Mendelsohn et al., Langmuir 2000, 16, 5017; Fery et al., Langmuir 2001, 17, 3779; Shiratori et al., Macromolecules 2000, 33, 4213; and U.S. patent application Ser. No. 10/393,360, each of which is incorporated by reference in its entirety. The multilayer can be described by the number of bilayers it includes, a bilayer resulting from the sequential application of oppositely charged polyelectrolytes.

A coating of this type can be applied to any surface amenable to the water based layer-by-layer (LbL) adsorption process used to construct these polyelectrolyte multilayers. Because the water based process can deposit polyelectrolytes wherever the aqueous solution contacts a surface, even the inside surfaces of objects having a complex topology can be coated. In general, a polyelectrolyte can be applied to a surface by any method amenable to applying an aqueous solution to a surface, such as dipping or spraying.

Other modifications of a deposited polyelectrolyte multilayer are possible. For example, a nonporous polyelectrolyte multilayer can form porous thin film structures induced by a simple acidic, aqueous process. Tuning of this pore forming process, for example, by the manipulation of such parameters as salt content (ionic strength), temperature, or surfactant chemistry, can lead to the creation of micropores, nanopores, or a combination thereof. A nanopore has a diameter of less than 150 nm, for example, between 1 and 120 nm or between 10 and 100 nm. A nanopore can have diameter of less than 100 nm. A micropore has a diameter of greater than 150 nm, typically greater than 200 nm. Selection of pore forming conditions can provide control over the porosity of the coating. For example, the coating can be a nanoporous coating, substantially free of micropores. Alternatively, the coating can be a microporous coating having an average pore diameters of greater than 200 nm, such as 250 nm, 500 nm, 1 micron, 2 microns, 5 microns, 10 microns, or larger.

Desired chemistries can be included in the polyelectrolyte multilayers. The chemistry can be added during manufacture of the multilayer, or after manufacture. For example, antibacterial chemistries (such as silver nanoparticles or quaternary ammonium salts) can be included in the multilayer during manufacture. The resulting multilayer can then have desired properties (such as antibacterial properties) arising from the incorporated chemistry. In some circumstances, the chemistry can be controllably released from the multilayer.

Surfaces having a nanotexture can exhibit extreme wetting properties. A nanotexture refers to surface features, such as ridges, valleys, or pores, having nanometer (i.e., typically less than 1 micrometer) dimensions. In some cases, the features will have an average or rms dimension on the nanometer scale, even though some individual features may exceed 1 micrometer in size. The nanotexture can be a 3D network of interconnected pores. Depending on the structure and chemical composition of a surface, the surface can be hydrophilic, hydrophobic, or at the extremes, superhydrophilic or superhydrophobic. One method to create the desired texture is with a polyelectrolyte multilayer. Polyelectrolyte multilayers can also confer desirable optical properties to surfaces, such as anti-reflectivity, or reflectivity in a desired range of wavelengths. See, for example, U.S. Patent Application Publication No. 2003/0215626, and U.S. patent application Ser. No. 10/912,540, each of which is incorporated by reference in its entirety.

Hydrophilic surfaces attract water; hydrophobic surfaces repel water. In general, a non-hydrophobic surface can be made hydrophobic by coating the surface with a hydrophobic material. The hydrophobicity of a surface can be measured, for example, by determining the contact angle of a drop of water on the surface. The contact angle can be a static contact angle or dynamic contact angle. A dynamic contact angle measurement can include determining an advancing contact angle or a receding contact angle, or both. A hydrophobic surface having a small difference between advancing and receding contact angles (i.e., low contact angle hysteresis) can be desirable. Water droplets travel across a surface having low contact angle hysteresis more readily than across a surface having a high contact angle hysteresis.

A surface can be superhydrophilic. A superhydrophilic surface is completely and instantaneously wet by water, i.e., exhibiting water droplet advancing contact angles of less than 5 degrees within 0.5 seconds or less upon contact with water. See, for example, Bico, J. et al., *Europhys. Lett.* 2001, 55, 214-220, which is incorporated by reference in its entirety. At the other extreme, a surface can be superhydrophobic, i.e. exhibiting a water droplet advancing contact angles of 150° or higher. The lotus leaf is an example of a superhydrophobic surface (See Neinhuis, C.; Barthlott, W.

Ann. Bot. 1997, 79, 677; and Barthlott, W.; Neinhuis, C. Planta 1997, 202, 1, each of which is incorporated by reference in its entirety). The lotus leaf also exhibits very low contact angle hysteresis: the receding contact angle is within 5° of the advancing contact angle (See, for example, Chen, W.; et al. *Langmuir* 1999, 15, 3395; and Oner, D.; McCarthy, T. J. *Langmuir* 2000, 16, 7777, each of which is incorporated by reference in its entirety).

Textured surfaces can promote superhydrophilic behavior. Early theoretical work by Wenzel and Cassie-Baxter and more recent studies by Quéré and coworkers suggest that it is possible to significantly enhance the wetting of a surface with water by introducing roughness at the right length scale. See, for example, Wenzel, R. N. *J. Phys.* Colloid Chem. 1949, 53, 1466; Wenzel, R. N. *Ind. Eng. Chem.* 1936, 28, 988; Cassie, A. B. D.; Baxter, S. *Trans. Faraday Soc.* 1944, 40, 546; Bico, J.; et al., D. *Europhysics Letters* 2001, 55, (2), 214-220; and Bico, J.; et al. *Europhysics Letters* 1999, 47, (6), 743-744, each of which is incorporated by reference in its entirety. Building on this work, both lithographically textured surfaces and microporous surfaces can be rendered superhydrophilic. See, e.g., McHale, G.; Shirtcliffe, N. J.; Aqil, S.; Perry, C. C.; Newton, M. I. *Physical Review Letters* 2004, 93, (3), which is incorporated by reference in its entirety. The intriguing possibility of switching between a superhydrophobic and superhydrophilic state has also been demonstrated with some of these surface structures. See, for example, Sun, T. L.; et al. *Angewandte Chemie-International Edition* 2004, 43, (3), 357-360; and Gao, Y. F.; et al. *Langmuir* 2004, 20, (8), 3188-3194, each of which is incorporated by reference in its entirety.

UV Light-Induced Switching Wettability of Photoactive Materials

Although the mechanism for light-induced switching wettability of photoactive materials is not fully understood, the prerequisite is the excitation of photoactive materials by light with energy equal to or larger than the band gap. This results in the generation of charge carriers (i.e., electrons and holes) that change the reactivity of the material. Typically the band gap of photoactive materials is large ($TiO_2$ ~3.2 eV and ZnO~3.3 eV). Thus in order to excite photoactive materials, irradiation of light with high energy (UV light, $\lambda$<390 nm) is required.

1. $TiO_2$

A number of methods have been used to create $TiO_2$ surfaces including the sol-gel method, aerosol-deposition, hydrothermal method, spray pyrolysis, anodic oxidation and templating. See, Kontos, A. I., Kontos, A. G., Tsoukleris, D. S., Vlachos, G. D. & Falaras, P. Superhydrophilicity and photocatalytic property of nanocrystalline titania sol-gel films. *Thin Solid Films* 515, 7370-7375, doi:Doi 10.1016/J.Tsf2007.02.082 (2007), Park, J. J. et al. Superhydrophilic Transparent Titania Films by Supersonic Aerosol Deposition. *J Am Ceram Soc* 96, 1596-1601, doi:Doi 10.1111/Jace.12164 (2013), Miyauchi, M. & Tokudome, H. Superhydrophilic and transparent thin films of TiO2 nanotube arrays by a hydrothermal reaction. *J Mater Chem* 17, 2095-2100, doi:Doi 10.1039/B700387k (2007), Sun, R. D., Nakajima, A., Fujishima, A., Watanabe, T. & Hashimoto, K. Photoinduced surface wettability conversion of ZnO and TiO2 thin films. *J Phys Chem B* 105, 1984-1990, doi:Doi 10.1021/Jp002525j (2001), Li, Y. et al. Superhydrophobicity of 2D ZnO ordered pore arrays formed by solution-dipping template method. *J Colloid Interf Sci* 287, 634-639, doi:Doi 10.1016/J.Jcis.2005.02.010 (2005), and Kamegawa, T., Suzuki, N. & Yamashita, H. Design of macroporous TiO2 thin film photocatalysts with enhanced photofunctional properties. *Energ Environ Sci* 4, 1411-1416, doi:Doi 10.1039/C0ee00389a (2011), each of which is incorporated by reference in its entirety. $TiO_2$ surfaces prepared by such methods alter the wettability to superhydrophilicity upon irradiation of UV light. Due to intrinsic hydrophilicity of $TiO_2$, water contact angle change under UV light may not be significant. In order to amplify wettability switching, textured $TiO_2$ surfaces have been developed. Rough $TiO_2$ surfaces contain nanotube arrays, inverse opal three-dimensional structures, nanorod arrays and nanopores. See, Kamegawa, T., Suzuki, N. & Yamashita, H. Design of macroporous TiO2 thin film photocatalysts with enhanced photofunctional properties. *Energ Environ Sci* 4, 1411-1416, doi:Doi 10.1039/C0ee00389a (2011), Gu, Z. Z., Fujishima, A. & Sato, O. Biomimetic titanium dioxide film with structural color and extremely stable hydrophilicity. *Appl Phys Lett* 85, 5067-5069, doi:Doi 10.1063/1.1825052 (2004), and Feng, X. J., Zhai, J. & Jiang, L. The fabrication and switchable superhydrophobicity of TiO2 nanorod films. *Angew Chem Int Edit* 44, 5115-5118, doi:Doi 10.1002/Anie.200501337 (2005), each of which is incorporated by reference in its entirety. Such surfaces exhibited hydrophobicity or even superhydrophobicity before UV irradiation and became superhydrophilic after UV irradiation.

2. $TiO_2$ Modified with Hydrophobic Coatings $TiO_2$ surfaces have been modified with low surface energy materials (i.e., hydrophobic coatings) including fluoroalkylsilane, octadecylsilane, poly(methyl methacrylate) (PMMA) and styrene-co-acrylate oligomers. See, Nakajima, A. et al. Transparent superhydrophobic thin films with self-cleaning properties. *Langmuir* 16, 7044-7047, doi:Doi 10.1021/La000155k (2000), Li, J. S. S., Ueda, E., Nallapaneni, A., Li, L. X. X. & Levkin, P. A. Printable Superhydrophilic-Superhydrophobic Micropatterns Based on Supported Lipid Layers. *Langmuir* 28, 8286-8291, doi:Doi 10.1021/La3010932 (2012), Zhang, X. T. et al. Self-cleaning particle coating with antireflection properties. *Chem Mater* 17, 696-700, doi:Doi 10.1021/Cm0484201 (2005), Yang, M. J., Di, Z. F. & Lee, J. K. Facile control of surface wettability in TiO2/poly (methyl methacrylate) composite films. *J Colloid Interf Sci* 368, 603-607, doi:Doi 10.1016/J.Jcis.2011.11.037 (2012), and Ding, X. F., Zhou, S. X., Wu, L. M., Gu, G. X. & Yang, J. T. Formation of supra-amphiphilic self-cleaning surface through sun-illumination of titania-based nanocomposite coatings. *Surf Coat Tech* 205, 2554-2561, doi:Doi 10.1016/J.Surfcoat.2010.10.002 (2010), each of which is incorporated by reference in its entirety. Surface modifications lead to hydrophobicity by lowering solid surface energy before UV irradiation. After UV irradiation, the surfaces became superhydrophilic with $\theta_{water}$=0°. This is due to the formation of microcracks and decomposition of hydrophobic coatings.

3. $TiO_2$ Coupling/Doping with Other Materials

Coupling and/or doping with other semiconductors and/or metals are another strategy to enhance wettability switching of $TiO_2$. Various materials used for this purpose including $SiO_2$, $WO_3$, $SnO_2$, $Al_2O_3$ and $SrTiO_3$. See, Zhang, X. T., Fujishima, A., Jin, M., Emeline, A. V. & Murakami, T. Double-layered TiO2-SiO2 nanostructured films with self-cleaning and antireflective properties. *J Phys Chem B* 110, 25142-25148, doi:Doi 10.1021/Jp064442u (2006), Emeline, A. V., Rudakova, A. V., Sakai, M., Murakami, T. & Fujishima, A. Factors Affecting UV-Induced Superhydrophilic Conversion of a TiO2 Surface. *J Phys Chem C* 117, 12086-12092, doi:Doi 10.1021/Jp400421v (2013), Miyauchi, M., Nakajima, A., Hashimoto, K. & Watanabe, T. A highly hydrophilic thin film under 1 mu W/cm(2) UV illumination. *Adv Mater* 12, 1923-1927, doi:Doi 10.1002/

1521-4095(200012)12:24<1923::Aid-Adma1923>3.0.Co; 2-# (2000), Wu, Z., Lee, D., Rubner, M. F. & Cohen, R. E. Structural color in porous, superhydrophilic, and self-cleaning SiO2/TiO2 Bragg stacks. *Small* 3, 1445-1451, doi:Doi 10.1002/Sml1.200700084 (2007), Hattori, A., Tokihisa, Y., Tada, H. & Ito, S. Acceleration of oxidations and retardation of reductions in photocatalysis of a TiO2/SnO2 bilayer-type catalyst. *J Electrochem Soc* 147, 2279-2283, doi:Doi 10.1149/1.1393521 (2000), Tadanaga, K., Morinaga, J., Matsuda, A. & Minami, T. Superhydrophobic-superhydrophilic micropatterning on flowerlike alumina coating film by the sol-gel method. *Chem Mater* 12, 590-+, doi:Doi 10.1021/Cm990643h (2000), and Miyauchi, M., Nakajima, A., Fujishima, A., Hashimoto, K. & Watanabe, T. Photoinduced surface reactions on TiO2 and SrTiO3 films: Photocatalytic oxidation and photoinduced hydrophilicity. *Chem Mater* 12, 3-5, doi:Doi 10.1021/Cm990556p (2000), each of which is incorporated by reference in its entirety. Coupled or doped $TiO_2$ surfaces exhibited wettability switching under very weak UV illumination (<1 $\mu W/cm^2$), enhanced photocatalysis and self-cleaning ability.

4. Various Photoactive Materials

In addition to $TiO_2$, a wide range of photoactive materials has been utilized. ZnO is extensively studied due to its superior photocatalytic ability and switchable wettability under UV irradiation. See, Liu, H., Feng, L., Zhai, J., Jiang, L. & Zhu, D. B. Reversible wettability of a chemical vapor deposition prepared ZnO film between superhydrophobicity and superhydrophilicity. *Langmuir* 20, 5659-5661, doi:Doi 10.1021/La036280o (2004), Feng, X. J. et al. Reversible super-hydrophobicity to super-hydrophilicity transition of aligned ZnO nanorod films. *J Am Chem Soc* 126, 62-63, doi:Doi 10.1021/Ja038636o (2004), Huang, L. et al. Stable superhydrophobic surface via carbon nanotubes coated with a ZnO thin film. *J Phys Chem B* 109, 7746-7748, doi:Doi 10.1021/Jp046549s (2005), and Zhang, X. T., Sato, O. & Fujishima, A. Water ultrarepellency induced by nanocolumnar ZnO surface. *Langmuir* 20, 6065-6067, doi:Doi 10.1021/La049471f (2004), each of which is incorporated by reference in its entirety. Miyauchi et al. thoroughly studied wettability switching and photocatalysis of arrays of photoactive materials. See, Miyauchi, M., Nakajima, A., Watanabe, T. & Hashimoto, K. Photocatalysis and photoinduced hydrophilicity of various metal oxide thin films. *Chem Mater* 14, 2812-2816, doi:Doi 10.1021/Cm020076p (2002), which is incorporated by reference in its entirety. They reported that $TiO_2$, ZnO, $SnO_2$, $WO_3$, $V_2O_5$ exhibited superhydrophilicity whereas CeO, CuO, $MoO_3$, $Fe_2O_3$, $Cr_2O_3$ and $In_2O_3$ did not alter wettability upon UV light irradiation.

Visible Light-Induced Switching Wettability of Photoactive Materials

The large band gap photoactive materials require an excitation light wavelength range shorter than 400 nm (such as UV light), which limits its ability to absorb visible light or sunlight effectively. Tuning the bang gap response to the visible region is indispensable to enhance efficiency of wettability change as well as photocatalysis by utilizing a large fraction of solar spectrum.

Doping has been demonstrated as an effective solution to enhance the visible light-induced wettability switching of photoactive materials. Therefore, various materials have been employed in doping to lower the band gap. Among various dopants, nitrogen (N) is the most widely used material in doping techniques because nitrogen can be readily introduced in the structures due to its compatible atomic size with oxygen and high stability. See, Irie, H., Washizuka, S., Yoshino, N. & Hashimoto, K. Visible-light induced hydrophilicity on nitrogen-substituted titanium dioxide films. *Chem Commun*, 1298-1299, doi:Doi 10.1039/B302975a (2003), and Asahi, R., Morikawa, T., Ohwaki, T., Aoki, K. & Taga, Y. Visible-light photocatalysis in nitrogen-doped titanium oxides. *Science* 293, 269-271, doi:Doi 10.1126/Science. 1061051 (2001), each of which is incorporated by reference in its entirety. Nitrogen doping has been achieved utilizing various techniques including sol-gel method, metalorganic chemical vapor deposition, anodizing, hydrothermal method and ultrasonic spray pyrolysis. See, Dunnill, C. W. et al. Visible light photocatalysts-N-doped TiO2 by sol-gel, enhanced with surface bound silver nanoparticle islands. *J Mater Chem* 21, 11854-11861, doi:Doi 10.1039/C1jm11557j (2011), Borras, A. et al. Effect of visible and UV illumination on the water contact angle of TiO2 thin films with incorporated nitrogen. *J Phys Chem C* 111, 1801-1808, doi:Doi 10.1021/Jp065392w (2007), Antony, R. P., Matthews, T., Dash, S. & Tyagi, A. K. Kinetics and Physicochemical Process of Photoinduced Hydrophobic <-> Superhydrophilic Switching of Pristine and N-doped TiO2 Nanotube Arrays. *J Phys Chem C* 117, 6851-6860, doi:Doi 10.1021/Jp400718t (2013), Wang, J. W., Mao, B. D., Gole, J. L. & Burda, C. Visible-light-driven reversible and switchable hydrophobic to hydrophilic nitrogen-doped titania surfaces: correlation with photocatalysis. *Nanoscale* 2, 2257-2261, doi:Doi 10.1039/C0nr00313a (2010), and Sahoo, M. et al. Physico-chemical Processes and Kinetics of Sunlight-Induced Hydrophobic <-> Superhydrophilic Switching of Transparent N-Doped TiO2 Thin Films. *Acs Appl Mater Inter* 5, 3967-3974, doi:Doi 10.1021/Am400785x (2013), each of which is incorporated by reference in its entirety. Similar to nitrogen, doping of carbon (C) and sulfur (S) has also been found to be effective in altering wettability of photoactive materials under visible light irradiation. See, Zhang, L. W., Dillert, R., Bahnemann, D. & Vormoor, M. Photo-induced hydrophilicity and self-cleaning: models and reality. *Energ Environ Sci* 5, 7491-7507, doi:Doi 10.1039/C2ee03390a (2012), Sakai, Y. W., Obata, K., Hashimoto, K. & Irie, H. Enhancement of visible light-induced hydrophilicity on nitrogen and sulfur-codoped TiO2 thin films. *Vacuum* 83, 683-687, doi:Doi 10.1016/J.Vacuum.2008.04.022 (2008), and Dunnill, C. W. et al. White light induced photocatalytic activity of sulfur-doped TiO2 thin films and their potential for antibacterial application. *J Mater Chem* 19, 8747-8754, doi:Doi 10.1039/B913793a (2009), each of which is incorporated by reference in its entirety. Codoping of two materials such as nitrogen and fluorine is another approach to achieve fast switching wettability and controlling absorption of visible light. See, Li, Q. & Shang, J. K. Composite Photocatalyst of Nitrogen and Fluorine Codoped Titanium Oxide Nanotube Arrays with Dispersed Palladium Oxide Nanoparticles for Enhanced Visible Light Photocatalytic Performance. *Environ Sci Technol* 44, 3493-3499, doi:Doi 10.1021/Es903928n (2010), and Kontos, A. G. et al. Visible light induced wetting of nanostructured N-F co-doped titania films. *Photoch Photobio Sci* 10, 350-354, doi:Doi 10.1039/C0pp00159g (2011), each of which is incorporated by reference in its entirety. In order to shift the absorption of photoactive materials into the visible spectral region, doping of transition metal such as vanadium (V) and $Y_2O_3$ has also been employed. See, Mokhtarimehr, M., Pakshir, M., Eshaghi, A. & Shariat, M. H. Super-hydrophilic property of vanadium doped TiO2-$SiO_2$ sol-gel derived thin film. *Thin Solid Films* 532, 123-126, doi:Doi 10.1016/J.Tsf.2012.12.104 (2013), and Zhang, X. C., Yang, H. M. & Tang, A. D. Optical, Electrochemical and Hydrophilic Properties of Y2O3 Doped TiO2 Nanocomposite Films. *J Phys Chem B* 112, 16271-16279, doi:Doi 10.1021/Jp806820p (2008), each of which is incorporated by reference in its entirety.

Using Dyes (Photosensitizers) to Sensitize Surfaces

Doping with various materials mentioned above has been successfully employed in altering wettability of photoactive materials under visible light. However, such doping techniques typically demand harsh conditions including high temperature, high pressure or toxic chemical environments, which limits versatility in the fabrication process. Further since visible light directly excites the doped photoactive materials, this may result in phtocatalytic decomposition of any organic deposits. Such visible light-induced photocatalysis of photoactive materials may hinder further surface modification processes that are needed for practical applications.

Dye sensitization has been used to improve spectral characteristics particularly for photovoltaics, so called dye-sensitized solar cells (DSSCs). DSSCs are based on the sensitization of mesoporous, nanocrystalline metal oxide films such as $TiO_2$ to visible light by the adsorption of organic molecular dyes. In contrast to doping, the dye gets excited rather than the $TiO_2$ under visible light irradiation into appropriate singlet or triplet states. The dyes are subsequently converted to cationic radicals after the dye injects electrons to the conduction band of the $TiO_2$. Thus it is usually referred to as an indirect excitation process that results in slow or negligible degradation of adsorbed dyes. Although dye sensitization has been widely used in solar applications to improve spectral characteristics, there is no prior art on using dye sensitized photoactive materials to control wettability of liquids.

Design Considerations for Photoactive Materials Sensitized with Photosensitizers (Dyes)

1. Photoactive Materials

In the present disclosure, $TiO_2$ was chosen as a photoactive material due to its nontoxicity, water insolubility, cheap availability and stability against chemical environments. Further, $TiO_2$ surfaces can be supported on various substrates such as glass, fibers, stainless steel, inorganic materials and sand. However, any of a wide range of materials can be used in fabrication of photoactive surfaces provided it has a suitable flat band potential that can induce photochemical reactions without biased potential. Non-limiting examples include $TiO_2$, $ZnO$, $WO_3$, $SrTiO_3$, $SnO_2$, $V_2O_5$, $CeO_2$, $CuO$, $MoO_3$, $Fe_2O_3$, $Cr_2O_3$, $In_2O_3$.

2. Methods for Fabrication of Photoactive Surfaces

Various fabrication methods can be utilized to develop photoactive surfaces. Non-limiting examples include sol-gel method, sol method, hydrothermal method, chemical vapor deposition, atomic layer deposition, electro-deposition, direct oxidation, magnetron sputtering, spincoating, dipcoating.

3. Selection of Photosensitizers (Dyes)

A large number of photosensitizers have been synthesized from various research groups and some of them are commercially available. For an effective sensitization process, it is important to select proper photosensitizers by considering following factors.

a) Adsorption: Liquids contacting the photoactive surfaces must not desorb the photosensitizers from the surface. In the sensitization process, photosensitizer molecules anchor on the surface via the —COOH groups, most likely in the form of carboxylate. However such anchoring was found to be insufficient to resist high shear forces as well as agitation or sonication. Thus it is desirable for photosensitizers to be strongly bonded to the surfaces.

b) Stability: Photoactive material can act as a photocatalyst for the light-induced photochemical reactions. Since photocatalytic reactions proceed in air-saturated and water-rich environment, the stability of the chosen photosensitizers is vital under these conditions. In the present disclosure, N3 (cis-Bis(isothiocyanato) bis(2,2'-bipyridyl-4,4'-dicarboxylato) ruthenium(II)) as a photosensitizer was initially chosen due to its favorable photoelectrochemical properties and high stability in the oxidized state, thus making practical applications feasible. A wide range of photosensitizers can be used in the fabrication of photosensitized surfaces. Non-limiting examples are (by code name) N3, D149, Chlorin, Coumarin 343, Eosin Y, N719, N621, N179, N749, N945, Z907, Z907-Na, Z910, Z675, Z646, Z991, K8, K19, $K_2O$, K51, K60, K68, K73, K77, D5, D6, D102, D205, D29, D35, D37, DPP07, DPP13, DPP14, DPP15, DPP17, A1, A2, A3, A597, C101, C102, C217, CYC-B1, CYC-B3, CYC-B11, YS-1, YS-2, YS-3, YS-4, YS-5, YE05, Y123, YD2, YD2-o-C8, T18, T66, TFRS-1, TFRS-2, TFRS-3, HRS-1, SJW-E1, S8, JK-91, JK-92, LI17, HY2, DX1, SM371, SM315, RK1, NKX-2569, MB18-N, LEG4, DEK1, B18, D45, D51, D77, C106, N820, N823, N886, K9, N712, NKK-2553, NKK-2554, TG6, JF419, MKA253, L1, MK245, HSQ4, and P1. See table below for a full chemical name for each code name when it is known. Dyes with only codes names are known are also listed in the table. See also, Yuancheng Qin and Qiang Peng, "Ruthenium Sensitizers and Their Applications in Dye-Sensitized Solar Cells," International Journal of Photoenergy, vol. 2012, Article ID 291579, 21 pages, 2012, Jun-Ho Yum et al., "Blue-Coloured Highly Efficient Dye-Sensitized Solar Cells by Implementing the Diketopyrrolopyrrole Chromophore," *Scientific Reports*, 3, Article number 2446, 2013, S. Shalini et al., "Status and outlook of sensitizers/dyes used in dye sensitized solar cells (DSSC): a review," International Journal of Energy Research, 2016, and Giuseppe Calogero et al., "Vegetable-based dye-sensitized solar cells," Chem. Soc. Rev. 2015, 44, 3244, each of which is incorporated by reference in its entirety.

| Code name | Chemical name |
| --- | --- |
| N3 | cis-Bis(isothiocyanato) bis(2,2'-bipyridyl-4,4'-dicarboxylato ruthenium(II) |
| D149 | 5-[[4-[4-(2,2-Diphenylethenyl)phenyl]-1,2,3-3a,4,8b-hexahydrocyclopent[b]indol-7-yl]methylene]-2-(3-ethyl-4-oxo-2-thioxo-5-thiazolidinylidene)-4-oxo-3-thiazolidineacetic acid |
| Chlorin | (17S,18S)-18-(2-carboxyethyl)-20-(carboxymethyl)-12-ethenyl-7-ethyl-3,8,13,17-tetramethyl-17,18,22,23-tetrahydroporphyrin-2-carboxylic acid |
| Coumarin 343 | 11-oxo-2,3,5,6,7,11-Hexahydro-1H-pyrano[2,3-f]pyrido[3,2,1-ij]quinoline-10-carboxylic acid |
| Eosin Y | 2',4',5',7'-Tetrabromofluorescein |
| N719 | Di-tetrabutylammonium cis-bis(isothiocyanato)bis(2,2'-bipyridyl-4,4'-dicarboxylato)ruthenium(II) |

-continued

| Code name | Chemical name |
|---|---|
| N621 | cis-di(thiocyanato)-(2,2'-bipyridyl-4,4'-dicarboxylic acid)(4,4'-ditridecyl-2,2'-bipyridyl)-ruthenium(II) |
| N749 | Tris(N,N,N-tributyl-1-butanaminium)[[2,2'':6',2''-terpyridine]-4,4',4''-tricarboxylato(3-)-N1,N1',N1'']tris(thiocyanato-N)hydrogen ruthenate(4-) |
| N945 | [Ru(4,-carboxylic acid-4'-carboxylate-2,2'-bipyridine)(4,4'-di-(2-(3,6-dimethoxyphenyl)ethenyl)-2,2'-bipyridine)(NCS)$_2$] |
| Z907 | cis-Bis(isothiocyanato)(2,2'-bipyridyl-4,4'-dicarboxylato)(4,4'-di-nonyl-2'-bipyridyl)ruthenium(II) |
| Z907-Na | NaRu(4-carboxylic acid-4'-carboxylate)(4,4'-dinonyl-2,2'-bipyridine)(NCS)$_2$ |
| Z910 | Ru(dcbpy)(dmsbpy)(NCS)$_2$; dcbpy = 4,4'-dicarboxylic acid-2,2'-bipyridine; dmsbpy, 4,4-di(3-methoxystyryl)-2,2-bipyridine; |
| Z991 (=CYC-B1) | cis-di(thiocyanato)bis-(2,2'-bipyridyl-4,4'-dicarboxylate) (4,4'-bis(5-(5-octyl-thiophen-2-yl)thiophen-2-yl)-2,2'-bipiridine) ruthenium(II) |
| K19 | [[2,2'-bipyridine]-4,4'-dicarboxylato(2-)-.kappa.N1,-.kappa.N1'] [4,4'-bis[(1E)-2-[4-(hexyloxy)phenyl]ethenyl]-2,2'-bipyridine-.kappa.N1,.kappa.N1']bis(thiocyanato-.kappa.N)-Ruthenate(2-), sodium hydrogen |
| K51 | NaRu(4-carboxylic acid-4'-carboxylate)(4,4'-bis[(triethylene glycol methyl ether) methyl ether]-2,2'-bipyridine)(NCS)$_2$ |
| K60 | Ru(4,4-dicarboxylic acid-2,2'-bipyridine) (4,4'-bis(2-(4-(1,4,7,10-tetraoxyundecyl)phenyl]ethenyl)-2,2'-bipyridine) (NCS)$_2$ |
| K68 | NaRu(4-carboxylic acid-4'-carboxylate) (4,4'-bis[(tri-ethyleneglycolmethylether) heptylether]-2,2'-bipyridine) (NCS)$_2$ |
| K73 | Ru((4,4-dicarboxylic acid-2,2'-bipyridine) (4,4'-bis(p-methoxystyryl)-2,2'-bipyridine)(NCS)$_2$) |
| K77 | Ru(2,2'-bipyridine-4,4'-dicarboxylic acid)(4,4'-bis(2-(4-tert-butyloxyphenyl)ethenyl)-2,2'-bipyridine) (NCS)$_2$ |
| D5 | 3-(5-(4-(diphenylamino)styryl)thiophen-2-yl)-2-cyanoacrylic acid |
| D102 | (5-{1,2,3,3a,4,8b-hexahydro-4-[4-(2,2-diphenylvinyl)phenyl]-cyclopeanta[b]indole-7-ylmethylene}-4-oxo-2-thioxo-thiazolidin-3-yl)acitic acid |
| D35 | (E)-3-(5-(4-(bis(2',4'-dibutoxy-[1,1'-biphenyl]-4-yl)amino)phenyl)thiophen-2-yl)-2-cyanoacrylic acid |
| DPP13 | (E)-3-(5-(4-(4-(5-(4-(bis(4-(hexyloxy)phenyl)amino)phenyl)thiophen-2-yl)-2,5-bis(2-ethylhexyl)-3,6-dioxo-2,3,5,6-tetrahydropyrrolo[3,4-c]pyrrol-1-yl)phenyl)furan-2-yl)-2-cyanoacrylic acid |
| A1 | [Ru(tctpy)(tfpd)(NCS)]; tctpy = 4,4',4''-tricarboxy-2,2':; 6',2''-terpyridine; tfpd = 1,1,1-trifluoropentane-2,4-dione |
| A2 | [Ru(tctpy)(tfdd)(NCS)]; tctpy = 4,4',4''-tricarboxy-2,2':; 6',2''-terpyridine; tfdd = 1,1,1-trifluorodecane-2,4-dione |
| A3 | [Ru(tctpy)(tfid)(NCS)]; tctpy = 4,4',4''-tricarboxy-2,2':; 6',2''-terpyridine; tfid = 1,1,1-trifluoroicosane-2,4-dione |
| C101 | Ruthenate(2-), [[2,2'-bipyridine]-4,4'-dicarboxylato(2-)-κN$^1$,κN$^{1'}$][4,4'-bis(5-hexyl-2-thienyl)-2,2'-bipyridine-κN$^1$,κN$^{1'}$]bis(thiocyanato-κN)-, hydrogen (1:2), (OC-6-32)- |
| CYC-B3 | (cis-di(thiocyanato)-4,4'-di(octylthienyl)-2,2'-bipyridine-4,4'-dicarboxylate-2,2'-bipyridine ruthenium(II)) |
| CYC-B11 | Ruthenate(2-), [[2,2'-bipyridine]-4,4'-dicarboxylato(2-)-κN$^1$,κN$^{1'}$][4,4'-bis[5'-(hexylthio)[2,2'-bithiophen]-5-yl]-2,2'-bipyridine-κN$^1$,κN$^{1'}$]bis(thiocyanato-κN)-, hydrogen (1:2), (OC-6-32)- |
| YS-1 | [Ru{(dcbpy)(dfbpy)(NCS)$_2$}]; dcbpy = 4,49-dicarboxy-2,29-bipyridyl; dfbpy = 4,4'-Bis(9,9-diethyl-9H fluoren-2-yl)-2,2'-bipyridine |
| YS-2 | Ru[(dcbpy)(sdfbpy)(NCS)2]; dcbpy = 4,49-dicarboxy-2,29-bipyridyl; stdfbpy = 4,4'-Bis(9,9-dihexyl-7-(5-hexylthiophen-2-yl)-9H-fluoren-2-yl)-2,2'-bipyridine |
| YS-3 | Ru[(dcbpy)(stdfbpy)(NCS)2]; dcbpy = 4,49-dicarboxy-2,29-bipyridyl; stdfbpy = 4,4'-Bis(9,9-dihexyl-7-(5-hexylthiophen-2-yl)-9H-fluoren-2-yl)-2,2'-bipyridine. |
| YS-4 | Ru[(dcbpy)(dcabpy)(NCS)2]; dcbpy = 4,49-dicarboxy-2,29-bipyridyl; dcabpy = 4,4'-Bis(9-hexyl-9H-carbazol-2-yl)-2,2'-bipyridine |
| YS-5 | Ru[(dcbpy)(dtpbpy)(NCS)2]; dcbpy = 4,49-dicarboxy-2,29-bipyridyl; |
| Y123 | 3-{6-{4-[bis(2',4'-dihexyloxybiphenyl-4-yl)amino-]phenyl}-4,4-dihexyl-cyclopenta-[2,1-b:3,4-b']dithiphene-2-yl}-2-cyanoacrylic acid |
| YD2 | Zinc(II) 5,15-Bis(3,5-di-tert-butylphenyl)-10-(bis(4-hexylphenyl)amino)-20-(4-carboxyphenylethynyl)porphyrin |
| YD2-o-C8 | 5,15-bis(2,6-dioctoxyphenyl)-10-(bis(4-hexylphenyl)amino-20-4-carboxyphenyl ethynyl)porphyrinato]zinc(II) |
| T18 | (cis-bis(thiocyanato)(2,20-bipyridyl-4,40-dicarboxylato){4,40-bis(1,3-dithian-2-ylidenemethyl)-2,20-bipyridine}ruthenium(II) mono-tetrabutylammonium salt |
| T66 | [Ru(6'-phenyl-4'-thiophen)-2-yl-[2,2']bipyridinyl-4-carboxylic acid)(4,4',4''-tricarboxy-2,2':6',2''-terpyridine)]Cl |
| HRS-1 | 2-thiophen-2-yl-vinyl-conjugated ruthenium complex, cis-Ru(dhtbpy)(dcbpy)(NCS)2 [dhtbpy = 4,49-di(hexylthienylvinyl)-2,29-bipyridyl; dcbpy = 4,49-dicarboxy-2,29-bipyridyl], |
| SJW-E1 | (cis-di(thiocyanato)-4,4'-di(octylethylenedioxythienyl)-2,2'-bipyridine-4,4'-dicarboxylate-2,2'-bipyridine ruthenium(II)) |
| JK-91 | cis-[Ru(R$_3$)(H$_2$dcbpy)(NCS)$_2$]; dcbpy = 4,4'-dicarboxylic acid-2,2'-bipyridine; |
| JK-92 | cis-[Ru(R$_4$)(H$_2$dcbpy)(NCS)$_2$]; dcbpy = 4,4'-dicarboxylic acid-2,2'-bipyridine; |
| SM371 | 4-{2-[(2Z,7Z,11E,16Z)-7,17-Bis[2,6-bis(octyloxy)phenyl]-12-[bis({4-[2,4-bis(hexyloxy)phenyl]phenyl})amino]-21,23,24,25-tetraaza-22-zincahexacyclo[9.9.3.1$^{3,6}$.1$^{13,16}$.0$^{8,23}$.0$^{18,21}$]pentacosa-1(20),2,4,6(25),7,9,11,13(24),14,16,18-undecaen-2-yl]ethynyl}benzoic acid |

-continued

| Code name | Chemical name |
|---|---|
| SM315 | 4-(7-{2-[(2Z,7Z,11E,16Z)-7,17-Bis[2,6-bis(octyloxy)phenyl]-12-[bis({4-[2,4-bis(hexyloxy)phenyl]phenyl})amino]-21,23,24,25-tetraaza-22-zincahexacyclo[9.9.3.1$^{3,6}$.1$^{13,16}$.0$^{8,23}$.0$^{18,21}$]pentacosa-1(20),2,4,6(25),7,9,11,13(24),14,16,18-undecaen-2-yl]ethynyl}-2,1,3-benzothiadiazol-4-yl)benzoic acid |
| NKX-2569 | 2-cyano-7,7-bis(4-dimethylaminophenyl)hepta-2,4,6-trienoic acid |
| LEG4 | 3-{6-{4-[bis(2',4'-dibutyloxybiphenyl-4-yl)amino-]phenyl}-4,4-dihexyl-cyclopenta-[2,1-b:3,4-b']dithiophene-2-yl}-2-cyanoacrylic acid |
| D45 | (E)-3-(5-(4-(bis(2',4'-dimethoxy-[1,1'-biphenyl]-4-yl)amino)phenyl)thiophen-2-yl)-2-cyanoacrylic acid |
| D51 | (E)-3-(6-(4-(bis(2',4'-dimethoxy-[1,1'-biphenyl]-4-yl)amino)phenyl)-4,4-dihexyl-4H-cyclopenta[2,1-b:3,4-b']dithiophen-yl)-2-cyanoacrylic acid |
| D77 | {5-[1,2,3,3a,4,8b-hexahydro-4-(4-methoxyphenyl)-cyclopeanta[b]indole-7-ylmethylene]-4-oxo-2-thioxo-thiazolidin-3-yl}acitic acid |
| C106 | cis-bis(thiocyanato)(2,2'-bipyridyl-4,4'-dicarboxylato){4,4'-bis[5-(hexylthio)thiophen-2-yl]-2,2'-bipyridine}ruthenium(II) |
| N820 | cis-di(thiocyanato)-(2,2'-bipyridyl-4,4'-dicarboxylic acid)(4,4'-dimethyl-2,2'-bipyridyl)-ruthenium(II) |
| N823 | cis-di(thiocyanato)-(2,2'-bipyridyl-4,4'-dicarboxylic acid)(4,4'-dihexyl-2,2'-bipyridyl)-ruthenium(II) |
| N886 | trans-[Ru(L)(NCS)2], L = 4,4'''-di-tert-butyl-4',4''-bis(carboxylic acid)-2,2':6',2'':6'',2'''-quaterpyridine |
| K9 | cis-di(thiocyanato)-(2,2'-bipyridyl-4,4'-bis(carboxyvinyl))-(2,2'-bipyridine-4,4'-dinonyl)-ruthenium(II) |
| N712 | tetra(tetrabutylammonium)[cis-di(thiocyanato)-bis(2,2'-bipyridyl-4,4'-dicarboxylate)-ruthenium(II)] |
| NKX-2553 | 2-cyano-5-(4-dimethylaminophenyl)penta-2,4-dienoic acid (NKX-2553) |
| NKX-2554 | -Cyano-5,5-bis(4-dimethylaminophenyl)penta-2,4-dienoic acid (NKX-2554) |
| TG6 | cis-bis(thiocyanato)(2,2'-bipyridyl-4,4'-dicarboxylato){4,4'-bis[2-(4-hexylsulfanylphenyl)vinyl]-2,2'-bipyridine}ruthenium(II) |
| JF419 | (E)-3-(6-(4-(bis(5,7-bis(hexyloxy)-9,9-dimethyl-9H-fluoren-2-yl)amino)phenyl)-4,4-dihexyl-4H-cyclopenta[2,1-b:3,4-b']dithiophen-2-yl)-2-cyanoacrylic acid |
| MKA253 | (E)-3-(6-(4-(bis(5,7-dibutoxy-9,9-dimethyl-9H-fluoren-2-yl)amino)phenyl)-4,4-dihexyl-4H-cyclopenta[2,1-b:3,4-b']dithiophen-2-yl)-2-cyanoacrylic acid |
| L1 | 5-[4-(diphenylamino)phenyl]thiophene-2-cyanoacrylic acid |
| MK245 | 3-(5-(4-(diphenylamino)styryl)thiophen-2-yl)-2-cyanoacrylic acid |
| HSQ4 | (3Z,4Z)-4-((5-carboxy-3,3-dimethyl-1-octyl-3H-indol-1-ium-2-yl)methylene)-2-(((E)-5-carboxy-3,3-dimethyl-1-octylindolin-2-ylidene)methyl)-3-(1-cyano-2-ethoxy-2-oxoethylidene)cyclobut-1-en-1-olate |
| P1 | 4-(Bis-{4-[5-(2,2-dicyano-vinyl)-thiophene-2-yl]-phenyl}-amino)-benzoic acid |
| | Commercially available, but only code name is known |

N179
Z675
Z646
K8
K20
D6
D205
D29
D37
C102
C217
TFRS-1
TFRS-2
TFRS-3
S8
LI17
HY2
DX1
DPP07
DPP14
DPP15
DPP17
A597
YE05
RK1
MB18-N
DEK1
B18

4. Liquids

Photosensitized surfaces alter their wettability upon irradiation of light. Changes in wettability allows for controlling the behavior of contacting liquids on the surfaces including contact angles, droplet motion and effective area of the solid-liquid interface. Utilizing photosensitized surfaces, it is feasible to control the behaviors of various liquids including but not limited to water, hydrocarbons, fluorocarbons, electrolyte, ionic liquids, dielectric liquids, emulsions, mixtures of any of liquids.

5. Light

Photosensitizers absorb light with particular wavelength depending on their molecular structures. For an effective photo-induced wettability switching of surfaces, it is important to irradiate light with a particular wavelength which photosensitizers can absorb. For example, N3 absorbs a broad range of visible light with $\lambda_{max}=532$ nm. However, UV-Vis absorbance spectrum of N3 shows that it barely absorbs visible light with $\lambda>700$ nm whereas it has a strong absorption of light with $\lambda<550$ nm. In this case, in order for photo-induced wettability switching, irradiation of light with $\lambda<550$ nm is necessary.

6. Combinations of Multiple Photoactive Materials/Photosensitizers/Liquids/Light Due to various absorption spectra of a range of photosensitizers, sensitization of two or more photosensitizers with different absorption spectra may be advantageous in certain aspects. For example, if one sensitizer absorbs light with $\lambda<550$ nm and the other absorbs light with 550 nm$<\lambda<750$ nm, the surface sensitized by both sensitizers can absorb light with $\lambda<750$ nm. Thus the surface can be sensitive to light with a broad band spectrum.

Further, selective wettability switching can be achieved. For example, let us assume that one sensitizer adsorbed on the surface induces change in contact angle for oil upon a light with 550 nm$<\lambda<750$ nm. The other sensitizer on the same surface induces change in contact angle for water under a light with 550 nm$<\lambda$. In this case, controlling oil and/or water contact angles and droplet motions is feasible by irradiating a light with different wavelength.

By considering the above parameters, photoactive materials with photosensitizers can be useful a wide range of applications including separation, self-cleaning, lab-on-a-chip applications for controlling motion of liquid drops under light irradiation, antibacterial, antibiofouling coatings and photo-active switches.

Dye Sensitized $TiO_2$ Surfaces with Switchable Wettability

Imbibition of a liquid dye or adsorption of dye to a $TiO_2$ surface is an alternative approach for generating charge carriers upon light illumination. See, Oregan, B. & Gratzel, M. A Low-Cost, High-Efficiency Solar-Cell Based on Dye-Sensitized Colloidal Tio2 Films. Nature 353, 737-740, doi: Doi 10.1038/353737a0 (1991), Bach, U. et al. Solid-state dye-sensitized mesoporous TiO2 solar cells with high photon-to-electron conversion efficiencies. Nature 395, 583-585 (1998), Mathew, S. et al. Dye-sensitized solar cells with 13% efficiency achieved through the molecular engineering of porphyrin sensitizers. Nat Chem 6, 242-247, doi:10.1038/NCHEM.1861 (2014), and Gratzel, M. Photoelectrochemical cells. Nature 414, 338-344, doi:Doi 10.1038/35104607 (2001), each of which is incorporated by reference in its entirety. On a dye-sensitized $TiO_2$ surface, the optical absorption and charge-generating functions are achieved by excitation of dye and subsequent injection of charge carriers (e.g., electrons) into the conduction band of $TiO_2$. See, Gratzel, M. Photoelectrochemical cells. Nature 414, 338-344, doi:Doi 10.1038/35104607 (2001), Hardin, B. E., Snaith, H. J. & McGehee, M. D. The renaissance of dye-sensitized solar cells. Nat Photonics 6, 162-169, doi: 10.1038/NPHOTON.2012.22 (2012), and Gratzel, M. Dye-sensitized solar cells. J Photoch Photobio C 4, 145-153, doi:10.1016/S1389-5567(03)00026-1 (2003), each of which is incorporated by reference in its entirety. The light absorption behavior of a dye-sensitized $TiO_2$ surface can be readily tuned by careful consideration of the energy levels of the selected dye. Ruthenium (II) polypyridyl complexes have received particular interest due to their wide absorption range from the visible to the near-infrared regime and high stability in the oxidized state. See, Qin, Y. C. & Peng, Q. Ruthenium Sensitizers and Their Applications in Dye-Sensitized Solar Cells. Int J Photoenergy (2012) and Nazeeruddin, M. K., Klein, C., Liska, P. & Gratzel, M. Synthesis of novel ruthenium sensitizers and their application in dye-sensitized solar cells. Coordin Chem Rev 249, 1460-1467, doi:10.1016/j.ccr.2005.03.025 (2005), each of which is incorporated by reference in its entirety. Further, introduction of a textured roughness or porosity to the $TiO_2$ surface can dramatically increase the light absorption efficiency due to an increased specific surface area providing capillary stabilization of a surface adsorbed liquid film in which a large number of dye molecules can be directly adsorbed. Consequently, dye-sensitization may provide a versatile tool to tune the wettability of $TiO_2$ surfaces under visible-light illumination.

Figure 6A:
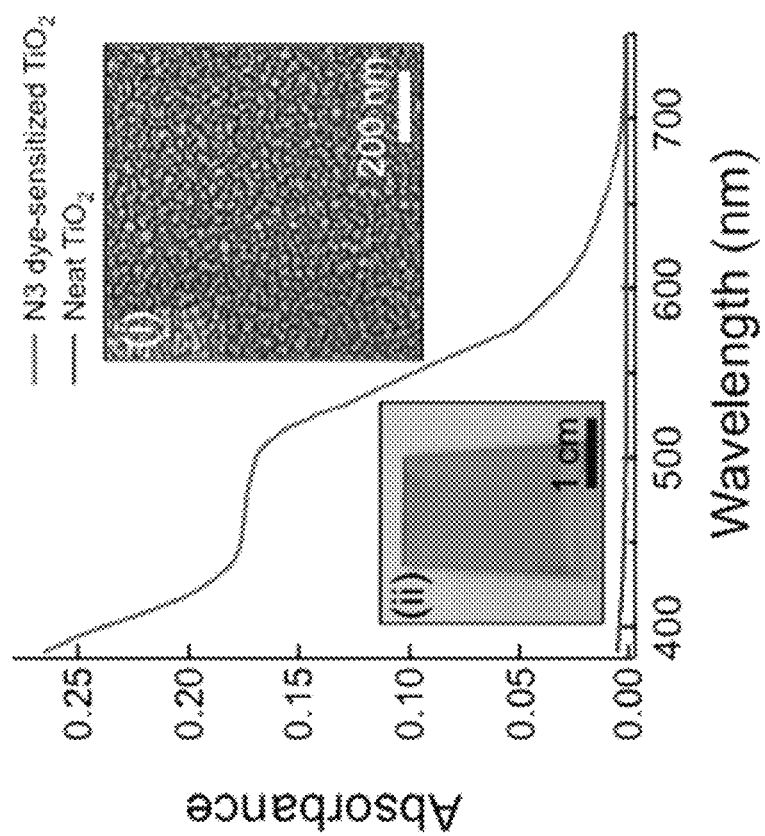
FIGS. 6A-6C show wetting behaviors of liquids on an N3 dye-sensitized $TiO_2$ surface.

Disclosed herein are a method and a system to switch the wettability of photoactive materials to be responsive in the visible spectral regime using dye sensitization. As an example, an N3 dye-sensitized $TiO_2$ surface can be fabricated. A thin, nanostructured and highly porous $TiO_2$ surface is prepared by layer-by-layer (LBL) deposition of negatively charged $TiO_2$ nanoparticles (average diameter $\approx 20$ nm) and positively charged poly(allylamine hydrochloride) on an indium tin oxide (ITO)-coated glass slide followed by calcination (see Examples). A scanning electron microscopy (SEM) image (see inset (i) in FIG. 6A) shows that the surface is highly porous with a large specific surface area. The ratio of the total surface area per unit projected area is estimated to be 56 (see Examples). The resulting porous $TiO_2$ surface is subsequently dip-coated in N3 dye solution (see Examples). N3 dye molecules chemisorb to the surface via carboxylate groups. See, Wayment-Steele, H. K. et al. Monitoring N3 Dye Adsorption and Desorption on TiO2 Surfaces: A Combined QCM-D and XPS Study. Acs Appl Mater Inter 6, 9093-9099, doi:10.1021/am500920w (2014), which is incorporated by reference in its entirety. Adsorption of N3 dye molecules leads to a deep brown coloration of the surface (see inset (ii) in FIG. 6A). The visible light absorption spectra of an N3 dye-sensitized $TiO_2$ surface was measured, and, as shown in FIG. 6A, the surface absorbs a broad range of the incident visible spectrum (390 nm$\leq\lambda\leq$700 nm). In contrast, an unsensitized LBL-deposited $TiO_2$ nanostructured surface displays negligible absorption in the visible regime due to the wide band gap energy of the $TiO_2$ particles ($\approx$3.2 eV). See, Fujishima, A., Zhang, X. T. & Tryk, D. A. TiO2 photocatalysis and related surface phenomena. Surf Sci Rep 63, 515-582, doi:10.1016/j.surfrep.2008.10.001 (2008), which is incorporated by reference in its entirety.

Figure 6B:
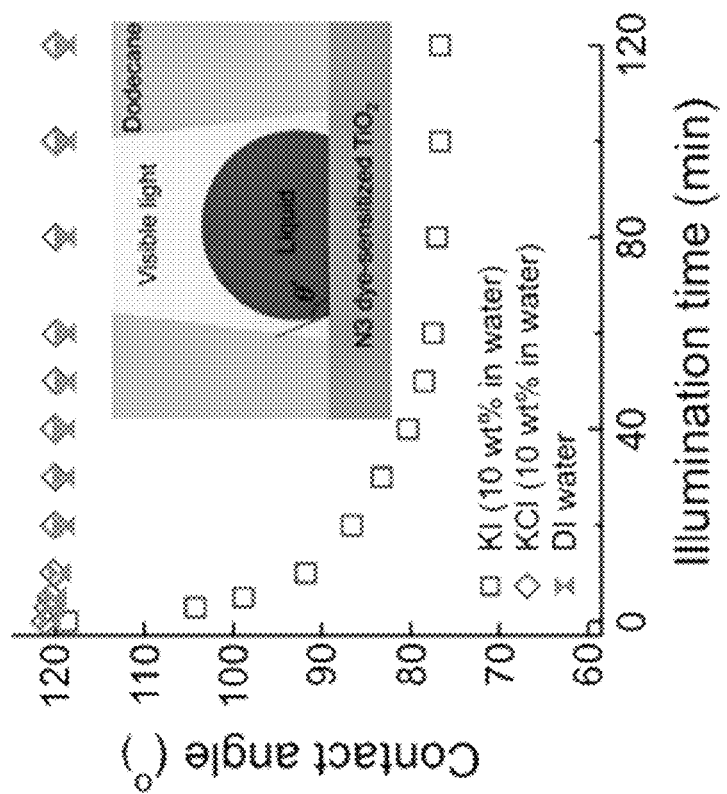
Figure 6C:
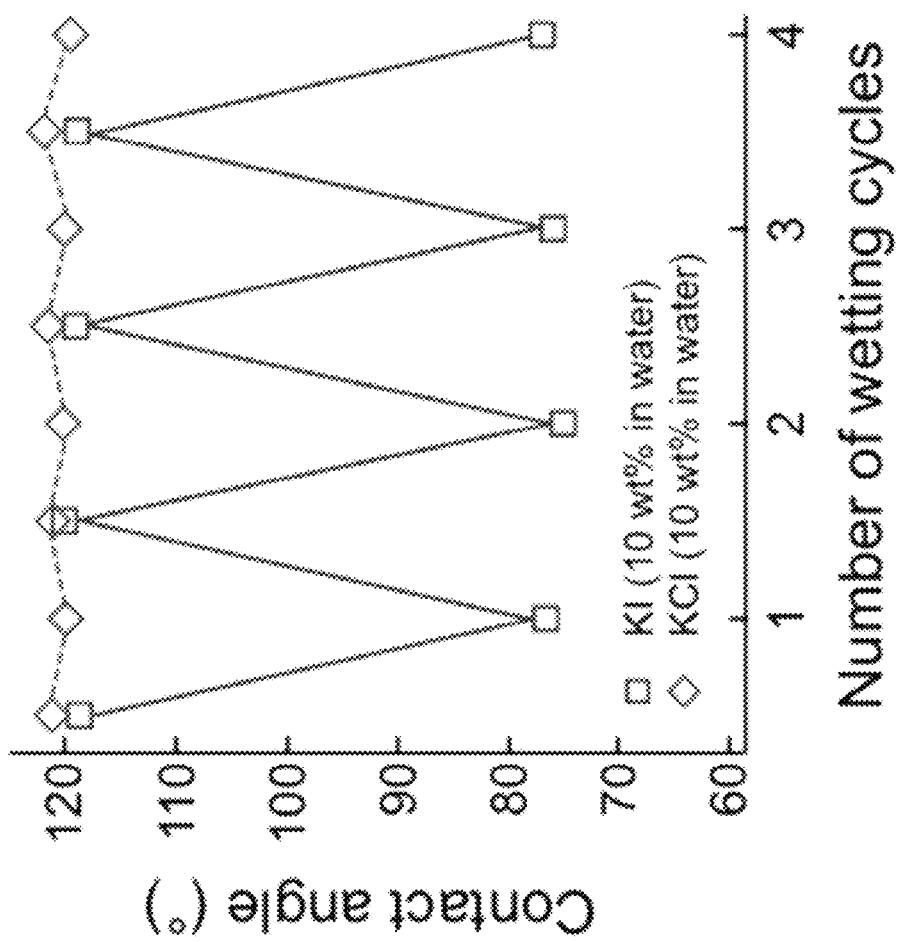

To study the photo-induced wettability change of the N3 dye-sensitized $TiO_2$ surface, the evolution in the contact angles were measured in situ for three liquid droplets: deionized (DI) water, potassium iodide (KI, 10 wt % in water) and potassium chloride (KCl, 10 wt % in water). In situ contact angle measurements were conducted under oil (e.g., dodecane) environment to minimize evaporation of a droplet due to the heat generated from the light source (see inset in FIG. 6B and Examples) and to simulate the condition expected in oil-water separation operation. See, Kwon, G. et al. On-Demand Separation of Oil-Water Mixtures. *Adv Mater* 24, 3666-3671, doi:10.1002/adma.201201364 (2012), Jen-Shih Chang, A. J. K., Joseph M. Crowley. *Handbook of Electrostatic Processes*. (CRC Press, 1995), and Anil K. Pabby, S. S. H. R., Ana Maria Sastre Requena. *Handbook of Membrane Separations: Chemical, Pharmaceutical, Food, and Biotechnological Applications*. (CRC Press, 2008), each of which is incorporated by reference in its entirety. The visible light source with intensity ($I=145$ mW/cm$^2$) is projected from above the surface in order to minimize intensity loss along the light transmission path. FIG. 6B shows the evolution in the macroscopic contact angles ($\theta^*$) for DI water, KI and KCl droplets as a function of illumination time. The equilibrium contact angles for DI water and KCl remain almost constant during illumination ($\Delta\theta^*_{DI\ water} \approx 3°$ and $\Delta\theta^*_{KCl} \approx 2°$ where $\Delta\theta^* = \theta^*_{t=0} - \theta^*_{t=120\ min}$), while those for KI decrease progressively from $\theta^*_{KI,t=0} = 119°$ with increasing illumination time before finally approaching $\theta^*_{KI,t=120\ min} = 77°$ (see FIG. 6B). The negligible wettability change for KCl was also independent of concentration while KI droplets with higher ionic concentration exhibited rapid decrease in contact angles (see Examples). Such a selective photo-induced wetting response of KI over KCl (or DI water) is further exemplified by considering multiple wetting cycles as shown in FIG. 6C. The contact angles for fresh droplets of KI placed at a fixed location on the surface cycles between $\theta^*_{KI,t=0} = 119°$ and $\theta^*_{KI,t=120\ min} \approx 77°$ under repeated illumination while that for KCl remains almost constant. Unlike an unsensitized, as-fabricated TiO$_2$ surface, X-ray photoelectron spectroscopy (XPS) analysis of the N3 dye-sensitized TiO$_2$ surface clearly indicates that the surface chemistry remains unaffected after multiple cycles of wetting under visible light illumination (Examples).

On dye-sensitized TiO$_2$ surfaces, photo-generated electrons from incident visible light illumination are injected and travel through the nanoporous TiO$_2$ network. See, Hardin, B. E., Snaith, H. J. & McGehee, M. D. The renaissance of dye-sensitized solar cells. *Nat Photonics* 6, 162-169, doi: 10.1038/NPHOTON.2012.22 (2012), and Gratzel, M. Dye-sensitized solar cells. *J Photoch Photobio C* 4, 145-153, doi:10.1016/S1389-5567(03)00026-1 (2003), each of which is incorporated by reference in its entirety. It is anticipated that this electron transfer results in the generation of an electric potential difference between the surface and the contacting liquid which can then induce electrowetting effects in liquid droplets on the surface. To understand this further, the physico-chemical origin of a photo-induced electric potential difference was considered under light illumination.

Figure 7A:
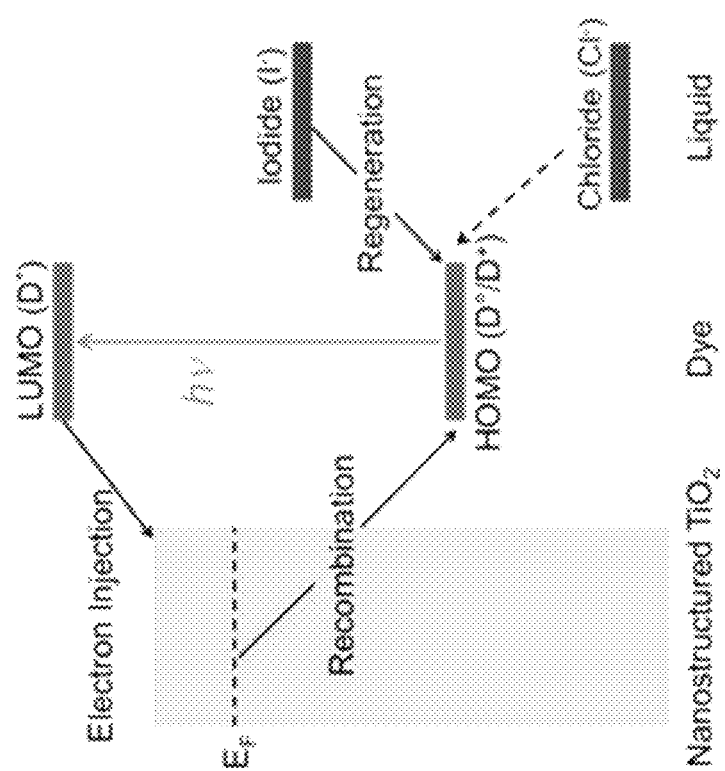
FIGS. 7A-7C show the origin of the photo-induced wettability change of an N3 dye-sensitized $TiO_2$ surface.

FIG. 7A shows a schematic and energy diagram of an N3 dye-sensitized TiO$_2$ surface contacting a KI droplet. After electron transfer upon illumination, a region over which the charge distribution differs from the bulk is produced. This corresponds to the electrolytic double layer and the accumulation layer at the contacting KI and TiO$_2$, respectively. See, Gratzel, M. Photoelectrochemical cells. *Nature* 414, 338-344, doi:Doi 10.1038/35104607 (2001), which is incorporated by reference in its entirety. Consequently, an electric potential difference (i.e., a measurable voltage) is generated between the contacting KI droplet and the underlying substrate. The oxidized dye (D$^+$) can be subsequently reduced by accepting an electron from the reducing agent (i.e., the iodide, I$^-$) in the KI through the chemical reaction $2D^+ + 3I^- \rightarrow 2D + I_3^-$ (a process known as regeneration). See, Pelet, S., Moser, J. E. & Gratzel, M. Cooperative effect of adsorbed cations and iodide on the interception of back electron transfer in the dye sensitization of nanocrystalline TiO2. *J Phys Chem B* 104, 1791-1795, doi:Doi 10.1021/Jp9934477 (2000), Clifford, J. N., Palomares, E., Nazeeruddin, M. K., Gratzel, M. & Durrant, J. R. Dye dependent regeneration dynamics in dye sensitized nanocrystalline solar cells: Evidence for the formation of a ruthenium bipyridyl cation/iodide intermediate. *J Phys Chem C* 111, 6561-6567, doi: 10.1021/jp067458t (2007), and Alebbi, M., Bignozzi, C. A., Heimer, T. A., Hasselmann, G. M. & Meyer, G. J. The limiting role of iodide oxidation in cis-Os(dcb)(2)(CN)(2)/TiO2 photoelectrochemical cells. *J Phys Chem B* 102, 7577-7581, doi:Doi 10.1021/Jp981643s (1998), each of which is incorporated by reference in its entirety. An alternative pathway for reducing the oxidized dye is by recombining with an electron in the TiO$_2$ (i.e., the process of recombination). See, Boschloo, G. & Hagfeldt, A. Characteristics of the Iodide/Triiodide Redox Mediator in Dye-Sensitized Solar Cells. *Accounts Chem Res* 42, 1819-1826, doi:10.1021/ar900138m (2009), and Antila, L. J., Myllyperkio, P., Mustalahti, S., Lehtivuori, H. & Korppi-Tommola, J. Injection and Ultrafast Regeneration in Dye-Sensitized Solar Cells. *J Phys Chem C* 118, 7772-7780, doi:10.1021/jp4124277 (2014), each of which is incorporated by reference in its entirety. While the regeneration is more favorable and orders of magnitude faster, the recombination also plays an important role in dye reduction process, especially under open-circuit conditions. See, Montanari, I., Nelson, J. & Durrant, J. R. Iodide electron transfer kinetics in dye-sensitized nanocrystalline TiO2 films. *J Phys Chem B* 106, 12203-12210, doi:10.1021/jp025824c (2002), Bauer, C., Boschloo, G., Mukhtar, E. & Hagfeldt, A. Interfacial electron-transfer dynamics in Ru(tcterpy)(NCS)(3)-sensitized TiO2 nanocrystalline solar cells. *J Phys Chem B* 106, 12693-12704, doi:10.1021/jp0200268 (2002), Nelson, J. Continuous-time random-walk model of electron transport in nanocrystalline TiO2 electrodes. *Phys Rev B* 59, 15374-15380, doi:Doi 10.1103/Physrevb.59.15374 (1999), Haque, S. A., Tachibana, Y., Klug, D. R. & Durrant, J. R. Charge recombination kinetics in dye-sensitized nanocrystalline titanium dioxide films under externally applied bias. *JPhys Chem B* 102, 1745-1749, doi:Doi 10.1021/Jp973335k (1998), and Cahen, D., Hodes, G., Gratzel, M., Guillemoles, J. F. & Riess, I. Nature of photovoltaic action in dye-sensitized solar cells. *J Phys Chem B* 104, 2053-2059, doi:Doi 10.1021/Jp993187t (2000), each of which is incorporated by reference in its entirety.

Figure 7B:
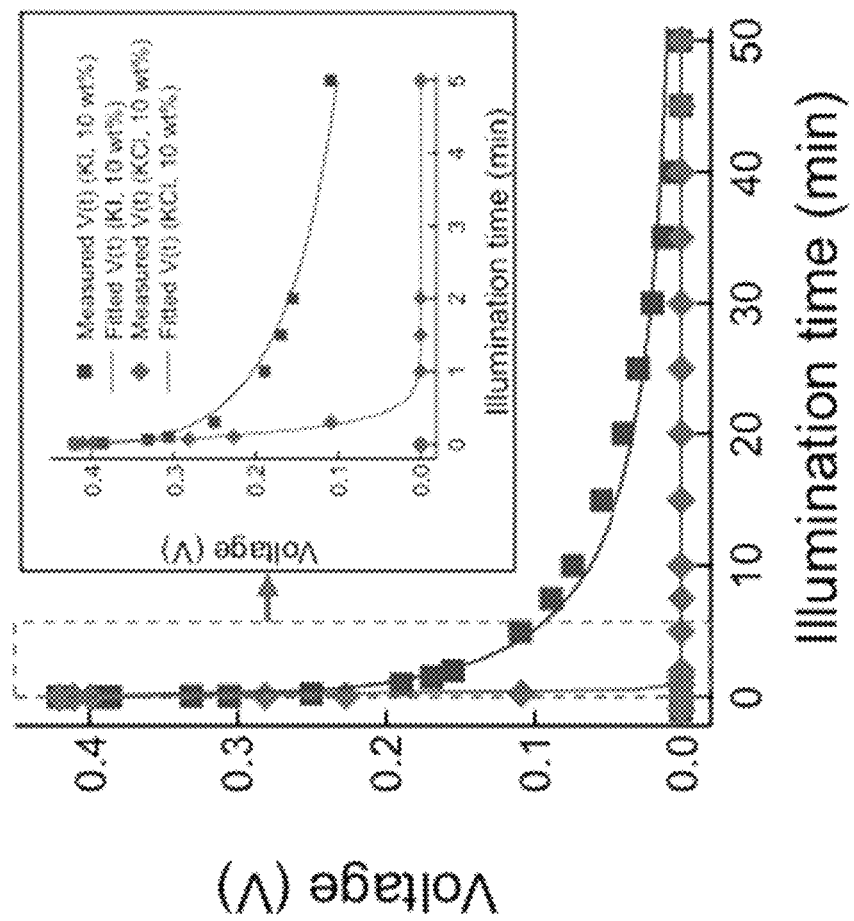

To validate hypothesis, the in situ voltage was measured across the contacting liquids and the N3 dye-sensitized TiO$_2$ surface while illuminating with visible light (see FIG. 7B). Immediately after the onset of illumination, a potential difference $V_{KI,\ t=0} \approx 0.42$ V is observed between the KI droplet and the lower ITO electrode. The voltage decreases gradually with increasing illumination time and eventually reaches zero after $t \approx 45$ min. Similar to conventional electrowetting, this photo-induced voltage causes spreading of the KI droplet on the N3 dye-sensitized TiO$_2$ surface. The gradual decrease in the measured voltage can be explained by considering the electrolytic double layer as a capacitor (C) and the underlying TiO$_2$ film as a resistor (R). Thus the KI droplet and the TiO$_2$ film can be considered as an imperfect RC circuit connected in series. When the capacitor in an imperfect RC circuit is discharged, the voltage V(t) is given by $$V(t) = V_o \exp[-(t/\tau_d)^\alpha] \quad (1)$$

where $V_o$, $\tau_d$, $\alpha$ denote the voltage at t=0, the relaxation time constant and the fractional derivative order, respectively. Note that equation (1) characterizes a fractional RC circuit where the capacitor (or a resistor) is imperfect. See, Westerlund, S. & Ekstam, L. Capacitor Theory. *Ieee T Dielect El In* 1, 826-839, doi:Doi 10.1109/94.326654 (1994), and Radwan, A. G. & Salama, K. N. Fractional-Order RC and RL Circuits. *Circ Syst Signal Pr* 31, 1901-1915, doi:10.1007/s00034-012-9432-z (2012), each of which is incorporated by reference in its entirety. The measured voltages across the KI and ITO (see FIG. 7B) are well described by equation (1) with $\tau_d$=130 sec and $\alpha$=0.42. Furthermore, changes in the contact angle halt instantaneously and the droplet shape remains unchanged when the illumination is turned off.

Unlike the gradual decrease in voltage between the KI droplet and the surface during optical illumination, a rapid decrease in the voltage was observed between a KCl droplet and the surface after the onset of illumination (see FIG. 7B). Rapid decrease in the voltage highlights the importance of the dye reduction process in photo-induced voltage generation. As the reduction potential of iodide (I−, $E_{red, I^-}$=0.53 V vs. NHE (Normal hydrogen electrode)) is above (i.e., less positive than) the HOMO energy level of N3 dye ($E_{HOMO, N3}$=1.0 V vs. NHE), it presents a driving force to reduce the oxidized dye. As a consequence, an N3 dye-sensitized TiO$_2$ surface contacting a KI droplet can maintain a prolonged voltage difference by suppressing the recombination process. In contrast, chloride (Cl−, $E_{red, Cl^-}$=1.36 V vs. NHE) cannot effectively reduce the oxidized N3 dye due to its higher reduction potential resulting in a dominant recombination process. See, Haynes, W. M. *CRC Handbook of Chemistry and Physics, 96th edition*. (CRC Press, 2015), and Jeon, J., Goddard, W. A. & Kim, H. Inner-Sphere Electron-Transfer Single Iodide Mechanism for Dye Regeneration in Dye-Sensitized Solar Cells. *J Am Chem Soc* 135, 2431-2434, doi:10.1021/ja311714a (2013), each of which is incorporated by reference in its entirety.

Figure 7C:
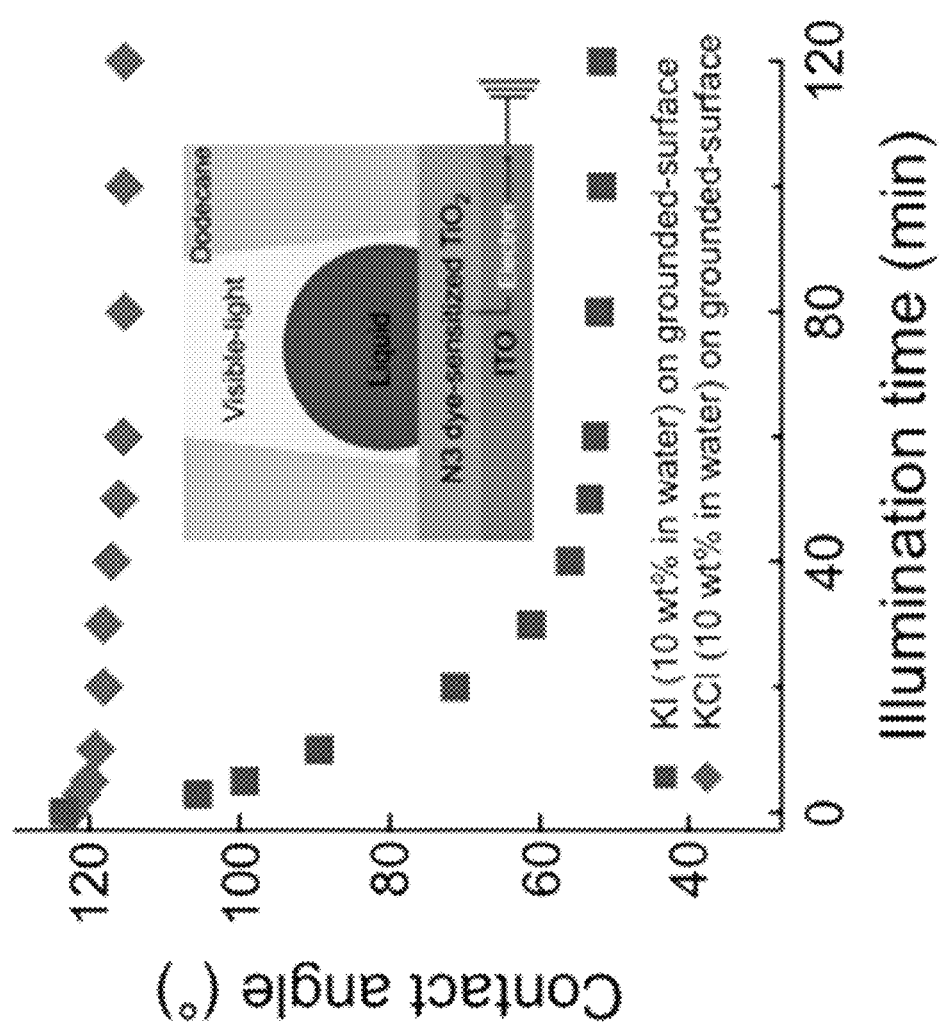

To probe the hypothesis that suppressing the recombination process leads to prolonged photo-induced voltage generation, and subsequently extension of the wetting (i.e., a larger change in contact angles), an electrically-grounded N3 dye-sensitized TiO$_2$ surface was fabricated (see inset in FIG. 7C). In contrast to the previous surface where photo-generated electrons continue to accumulate and participate in the recombination process, the electrically-grounded surface minimizes electron accumulation. FIG. 7C shows an enhanced decrease in macroscopic contact angles for KI ($\Delta\theta^*_{KI}$=72°) and KCl ($\Delta\theta^*_{KCl}$≈7°) droplets on the electrically-grounded N3 dye-sensitized TiO$_2$ surface after 120 min of illumination. This may be a direct consequence of the suppression of the recombination process.

Figure 8A:
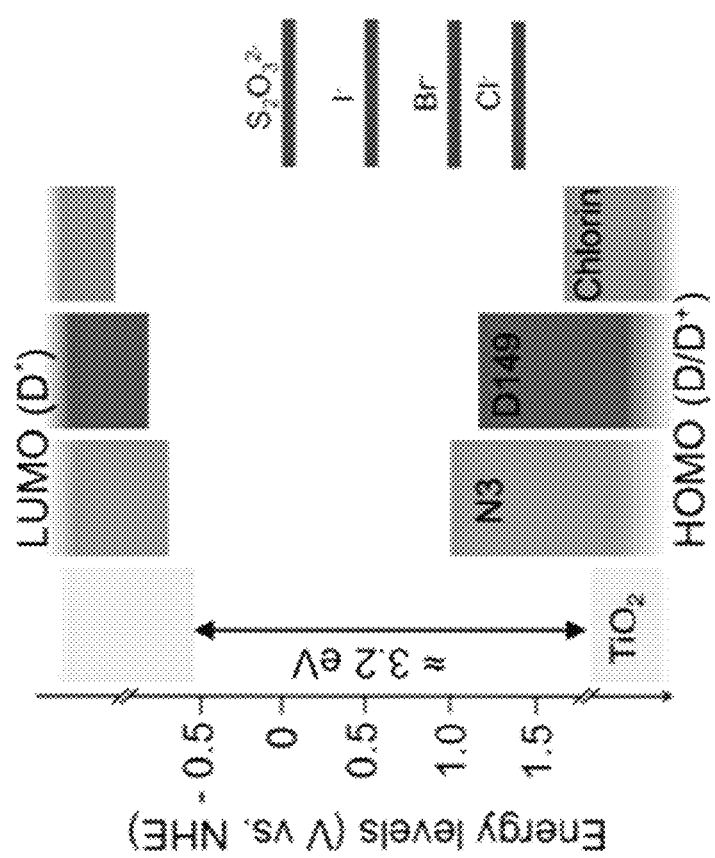
FIGS. 8A-8C show photo-induced wetting of contacting liquids on various dye-sensitized $TiO_2$ surfaces.
Figure 8B:
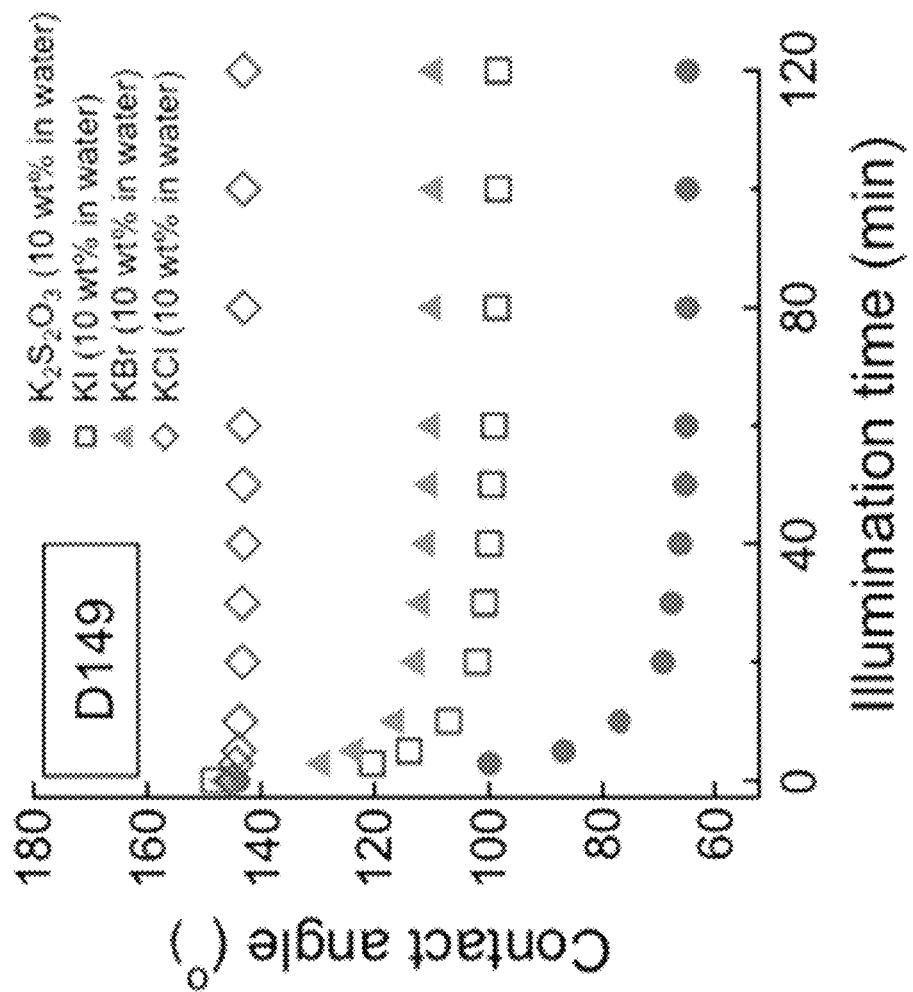

These findings provide us with design parameters to systematically manipulate the wettability of dye-sensitized TiO$_2$ surfaces towards different contacting liquids in response to visible light illumination. For effective wetting of specific liquids, it is preferential to regenerate the oxidized dye by a reducing agent within the contacting liquid (see FIG. 7A). This often requires careful consideration of the energy levels of the dye and different contacting liquids. As is well documented in the dye-sensitized solar cell literature (see Hardin, B. E., Snaith, H. J. & McGehee, M. D. The renaissance of dye-sensitized solar cells. *Nat Photonics* 6, 162-169, doi:10.1038/NPHOTON.2012.22 (2012), and Gratzel, M. Dye-sensitized solar cells. *J Photoch Photobio C* 4, 145-153, doi:10.1016/S1389-5567(03)00026-1 (2003), each of which is incorporated by reference in its entirety), effective dye-regeneration is typically achieved by using electrolytes that possess a reduction potential which is less positive than the HOMO energy level of dye. This enables us to create a design chart for photo-induced wetting of contacting liquids on a dye-sensitized TiO$_2$ surface. FIG. 8A shows an energy diagram of various dyes and electrolytes. The HOMO energy levels of the dyes are located in between the reduction potential of liquids considered in this work. Here D149 dye and Chlorin dye were chosen as sensitizers (see Examples). See, Liu, Z. Y. et al. Solution-Processed Organic Photovoltaics Based on Indoline Dye Molecules Developed in Dye-Sensitized Solar Cells. *Molecules* 18, 3107-3117, doi:10.3390/molecules18033107 (2013), and Wang, X. F. & Kitao, O. Natural Chlorophyll-Related Porphyrins and Chlorins for Dye-Sensitized Solar Cells. *Molecules* 17, 4484-4497, doi:10.3390/molecules17044484 (2012), each of which is incorporated by reference in its entirety. Similar to the N3 dye-sensitized TiO$_2$ surface, a D149 dye-sensitized TiO$_2$ and a Chlorin dye-sensitized TiO$_2$ absorb across a broad range of the visible light spectrum. As their lowest unoccupied molecular orbital (LUMO) energy levels are above (i.e., less positive than) the conduction band of TiO$_2$, efficient electron transfer can be achieved[47-49]. See, Liu, Z. Y. et al. Solution-Processed Organic Photovoltaics Based on Indoline Dye Molecules Developed in Dye-Sensitized Solar Cells. *Molecules* 18, 3107-3117, doi:10.3390/molecules18033107 (2013), Wang, X. F. & Kitao, O. Natural Chlorophyll-Related Porphyrins and Chlorins for Dye-Sensitized Solar Cells. *Molecules* 17, 4484-4497, doi:10.3390/molecules17044484 (2012), and Lightbourne, S. K. S., Gobeze, H. B., Subbaiyan, N. K. & D'Souza, F. Chlorin e6 sensitized photovoltaic cells: effect of co-adsorbents on cell performance, charge transfer resistance, and charge recombination dynamics. *J Photon Energy* 5, doi:Artn 053089 10.1117/1Jpe.5.053089 (2015), each of which is incorporated by reference in its entirety. However, subsequent regeneration of the oxidized dyes by various electrolytes will be selective due to their different HOMO energy levels ($E_{HOMO, D149}$=1.14 V vs. NHE and $E_{HOMO, Chlorin}$=1.72 V vs. NHE) with respect to the reduction potentials of various electrolytes. Along with KI and KCl, potassium thiosulfate (K$_2$S$_2$O$_3$, 10 wt % in water, $E_{red, K_2S_2O_3}$=0.08 V vs. NHE) and potassium bromide (KBr, 10 wt % in water, $E_{red, KBr}$=1.09 V vs. NHE) were used as contacting liquids. In situ photo-induced voltage measurements of a D149 dye-sensitized TiO$_2$ and a Chlorin dye-sensitized TiO$_2$ in contact with droplets of various electrolytes clearly indicate that a prolonged voltage difference across the surface and the contacting liquid droplet is achieved when $E_{HOMO, dye}>E_{red, liquid}$. FIG. 8B shows the evolution in the macroscopic contact angles for K$_2$S$_2$O$_3$, KI, KBr and KCl droplets on a D149 dye-sensitized TiO$_2$ surface under illumination. Contacting liquids with a lower reduction potential (i.e., less positive) than $E_{HOMO, D149}$ (e.g., K$_2$S$_2$O$_3$, KI and KBr, see also FIG. 8A) spread on the surface while a droplet of KCl exhibits a negligible contact angle decrease. In contrast, a decrease in the macroscopic contact angles were observed for all contacting liquids on a Chlorin dye-sensitized TiO$_2$ surface under visible light illumination (see FIG. 8C). This is a direct consequence of the effective dye-regeneration process with all contacting liquids as a result of the very high $E_{HOMO}$ of Chlorin dye. See, Wang, X. F. & Kitao, O. Natural Chlorophyll-Related Porphyrins and Chlorins for Dye-Sensitized Solar Cells. *Molecules* 17, 4484-4497, doi:10.3390/molecules17044484 (2012), and Lightbourne, S. K. S., Gobeze, H. B., Subbaiyan, N. K. & D'Souza, F. Chlorin e6 sensitized photovoltaic cells: effect of co-adsorbents on cell performance, charge transfer resistance, and charge recombination dynamics. *J Photon Energy* 5 (2015), each of which is incorporated by reference in its entirety. Selective wetting behaviors of $K_2S_2O_3$ (or KI) over KBr (or KCl) on an N3 dye-sensitized $TiO_2$ surface is also observed (FIG. 8B). This is the first-ever systematic demonstration of visible light induced wetting of contacting liquid droplet on dye-sensitized $TiO_2$ surfaces.

Figure 9A:
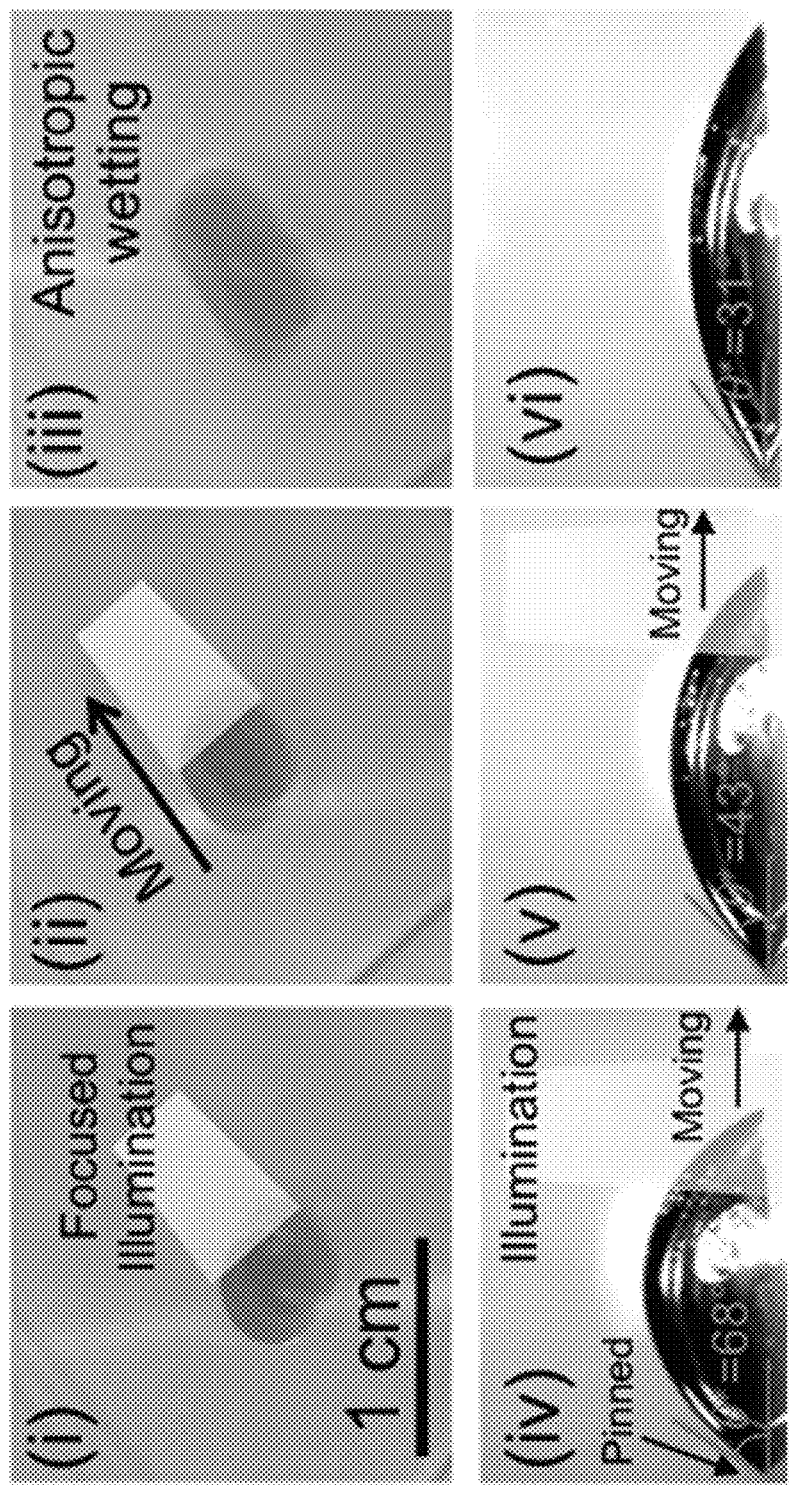
FIGS. 9A-9E show manipulating droplet motion on a Chlorin dye-sensitized $TiO_2$ surface.
Figure 9B:
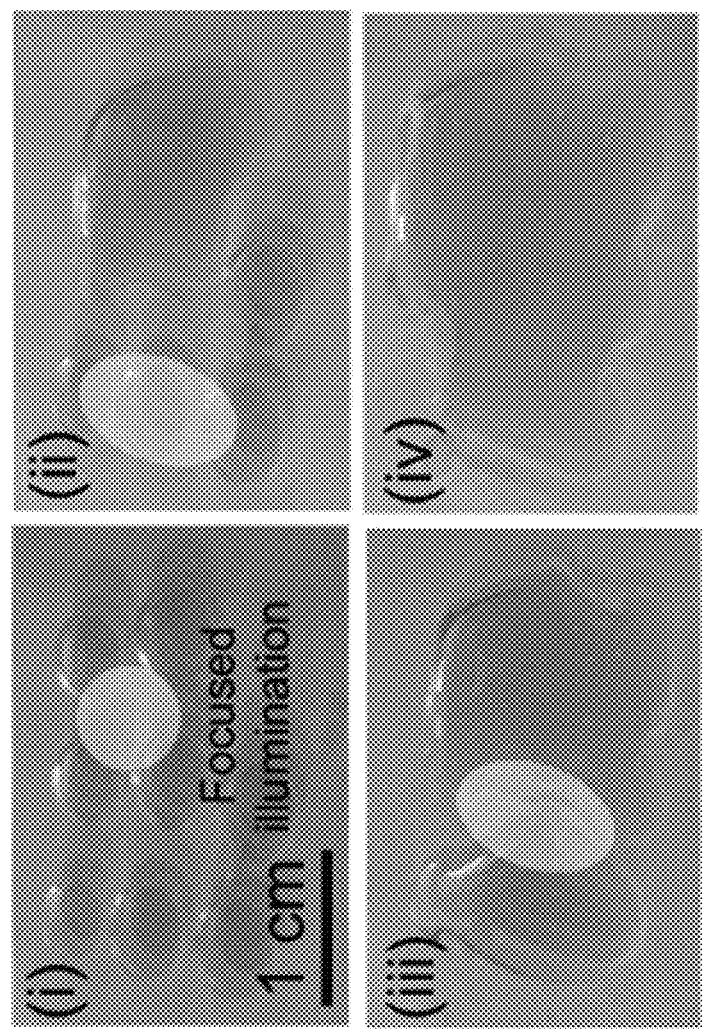

The ability to photo-induce the selective wetting of contacting liquids on a dye-sensitized $TiO_2$ surface provides a versatile tool to manipulate liquid motion. FIG. 9A shows visible-light-guided movement of an NaCl (10 wt % in water) droplet on a patterned dye-sensitized $TiO_2$ surface submerged in dodecane. The patterned surface consists of a thin channel of Chlorin dye-sensitized LBL-assembled nanoporous $TiO_2$ surrounded by a hydrophobic background (see Methods). A droplet of NaCl is placed on the channel, and white light is focused on one edge of the droplet (see FIG. 9A (i)). The contact angle at the interface between the liquid and the illuminated surface decreases while the other side remains pinned. Consequently, the droplet moves towards the illuminated edge (see FIG. 9A (ii)). Further illumination leads to an elongation of the droplet shape (see FIG. 9A (iii)). The photo-induced anisotropic wetting (i.e., progressive spreading in one direction while the other side remains pinned) of a NaCl droplet was observed on a Chlorin dye-sensitized $TiO_2$ surface (sequential snapshot images are shown in FIGS. 9A (iv)-(vi)). This anisotropic wetting behavior under focused optical illumination allows for coalescence of multiple aqueous droplets that are initially pinned on the surface. FIG. 9B shows sequential photographs of the coalescence of multiple NaCl droplets on a Chlorin dye-sensitized $TiO_2$ surface submerged in dodecane. By shining visible light at various locations between the droplets, photo-induce coalescence of all droplets result in a single continuous NaCl aqueous layer on the surface.

Figures 9C, 9D:
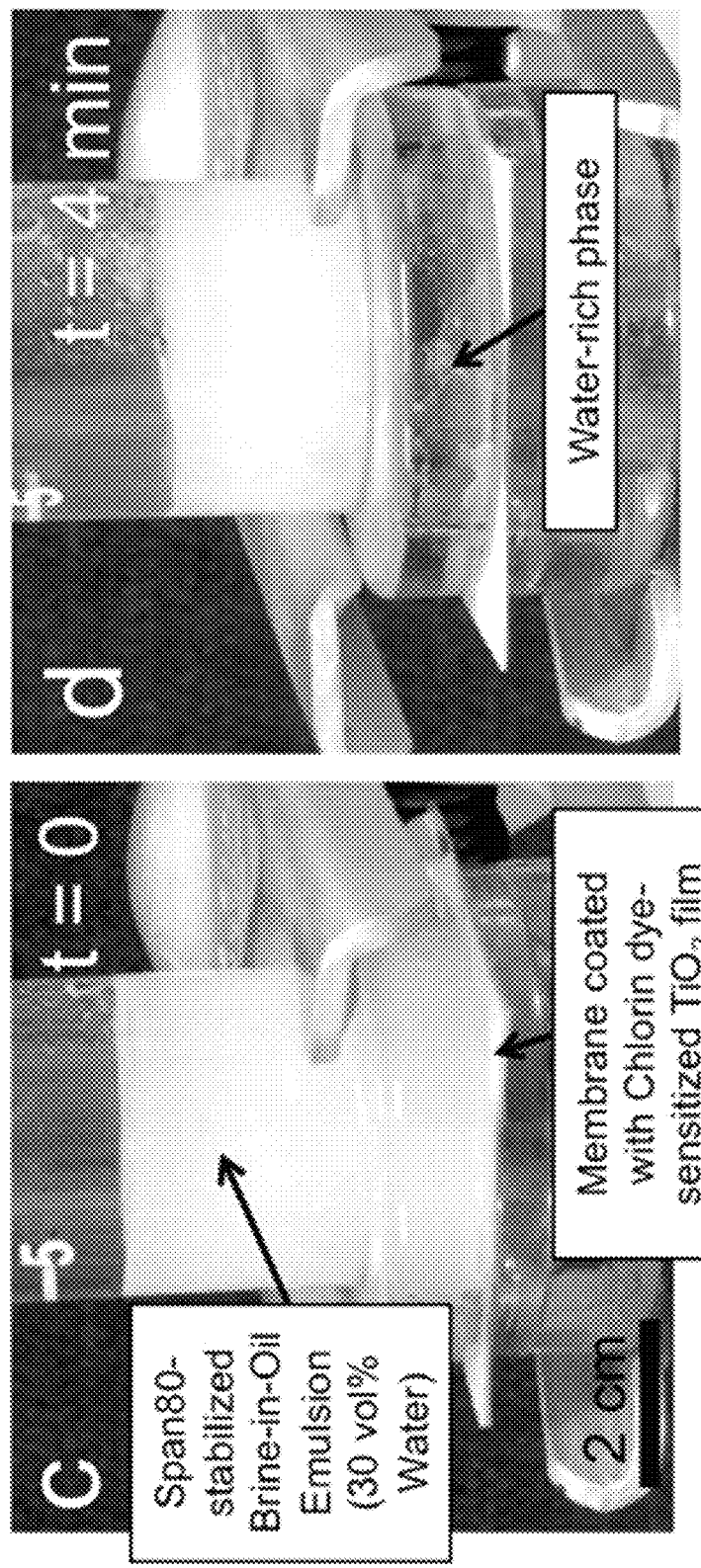
Figure 9E:
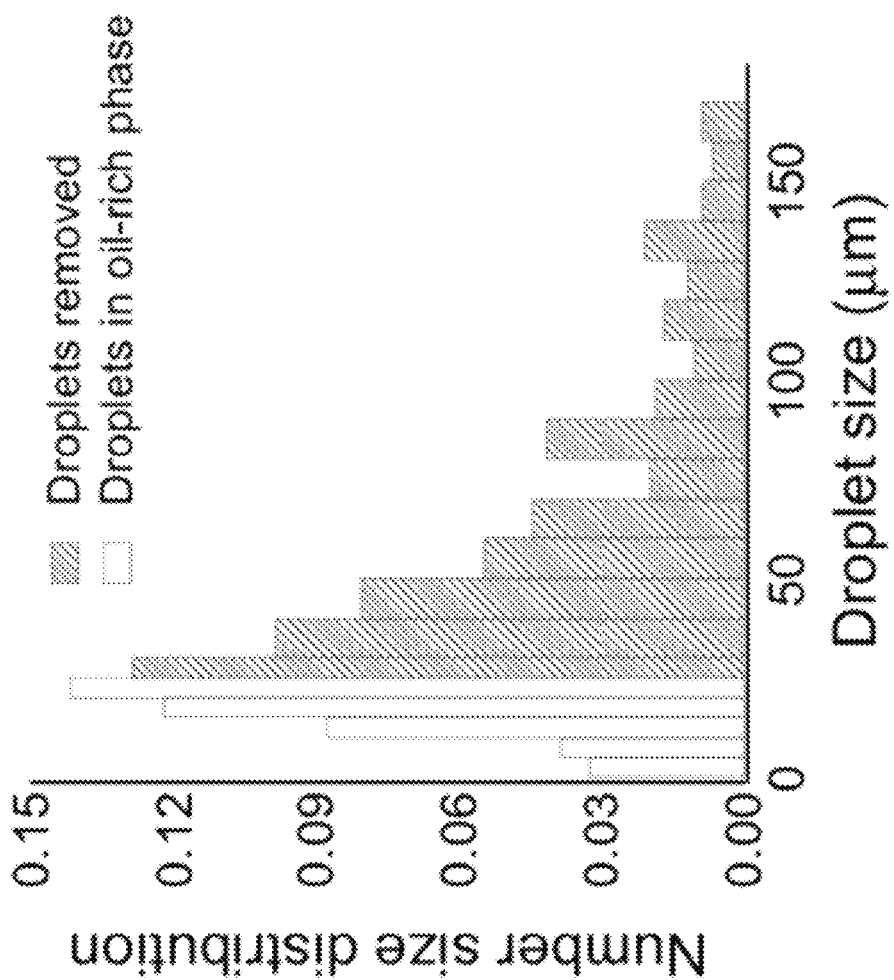

This photo-induced coalescence process is an ideal candidate to substitute for conventional electrostatic coalescence technique employed in demulsification (i.e., the conversion of an oil-water emulsion into two separate oil-free and water-free phases), especially for mixtures with high salt concentration (e.g., brine-oil emulsions) that are typically generated in enhanced oil-recovery operations. See, Kwon, G. et al. On-Demand Separation of Oil-Water Mixtures. *Adv Mater* 24, 3666-3671, doi:10.1002/adma.201201364 (2012), Jen-Shih Chang, A. J. K., Joseph M. Crowley. *Handbook of Electrostatic Processes*. (CRC Press, 1995), and Anil K. Pabby, S. S. H. R., Ana Maria Sastre Requena. *Handbook of Membrane Separations: Chemical, Pharmaceutical, Food, and Biotechnological Applications*. (CRC Press, 2008), each of which is incorporated by reference in its entirety. The demulsificiation of brine-oil emulsions using the photo-induced coalescence is highly desirable because conductive emulsions resulting from ionized salts create a current path upon application of an external electric field which hinders generation of induced dipole moments. See, Eow, J. S. & Ghadiri, M. Electrostatic enhancement of coalescence of water droplets in oil: a review of the technology. *Chem Eng J* 85, 357-368, doi:Doi 10.1016/S1385-8947(01)00250-9 (2002), which is incorporated by reference in its entirety. Here demulsification of a brine-oil emulsion was demonstrated utilizing photo-induced coalescence of water droplets containing salts on a dye-sensitized $TiO_2$ surface. FIGS. 9C and 9D show demulsification of a brine (10 wt % NaCl in water)-in-dodecane emulsion stabilized by 0.1 wt % of Span80 surfactant (see Examples). The demulsification apparatus consists of a stainless steel membrane (pore size≈2 μm) coated with Chlorin dye-sensitized $TiO_2$ nanostructured film sandwiched between the two vertical glass tubes. The emulsion is added to the upper tube and immediately visible light is illuminated on the membrane surface (see FIG. 9C). Brine droplets that contact the Chlorin dye-sensitized $TiO_2$ mesh surface spread and coalesce with other droplets under white light illumination. Within minutes of illumination, the brine-in-dodecane emulsion demulsifies into brine-rich and dodecane-rich phases (see FIG. 9D). FIG. 9E shows the number size distribution of the dodecane-rich retentate after 4 min of demulsification. The shaded region represents the brine droplets removed (corresponding to >99.9 vol %) during demulsification. By comparing with the feed emulsion, it is evident that nearly all brine droplets above 25 μm (i.e., >99.9 vol % of brine) are removed by photo-induced coalescence. The demulsification of a brine-in-oil emulsion using photo-induced coalescence of brine droplets was demonstrated on Chlorin dye-sensitized $TiO_2$ mesh surface.

In summary, dye-sensitized nanoporous $TiO_2$ surfaces can selectively change the wettability towards contacting liquids upon visible light illumination, due to a photo-induced voltage difference across the liquid and the surface. The HOMO energy level of the selected dye and the reduction potential of the contacting liquid droplet phase govern the effective dynamics of the photo-induced voltage difference. The photo-induced wettability change of a dye-sensitized $TiO_2$ surface enables external manipulation of liquid droplet motion across a surface upon visible light illumination. Spontaneous demulsification and separation of surfactant-stabilized brine-in-oil emulsion was demonstrated using photo-induced coalescence of brine droplets on a dye-sensitized $TiO_2$ surface. Such abilities to remotely activate and control the wettability states of surfaces through optical illumination will enable new microfluidic separation technologies as well as result in new sunlight-driven oil-water clean-up and deemulsification approaches.

EXAMPLES

Fabrication of $TiO_2$ Surfaces

A number methods can be used to create $TiO_2$ surfaces including sol-gel method, sol method, hydrothermal method, chemical vapor deposition, atomic layer deposition, electro-deposition, direct oxidation, magnetron sputtering, layer-by-layer (LBL) deposition.

Example 1

Figure 2:
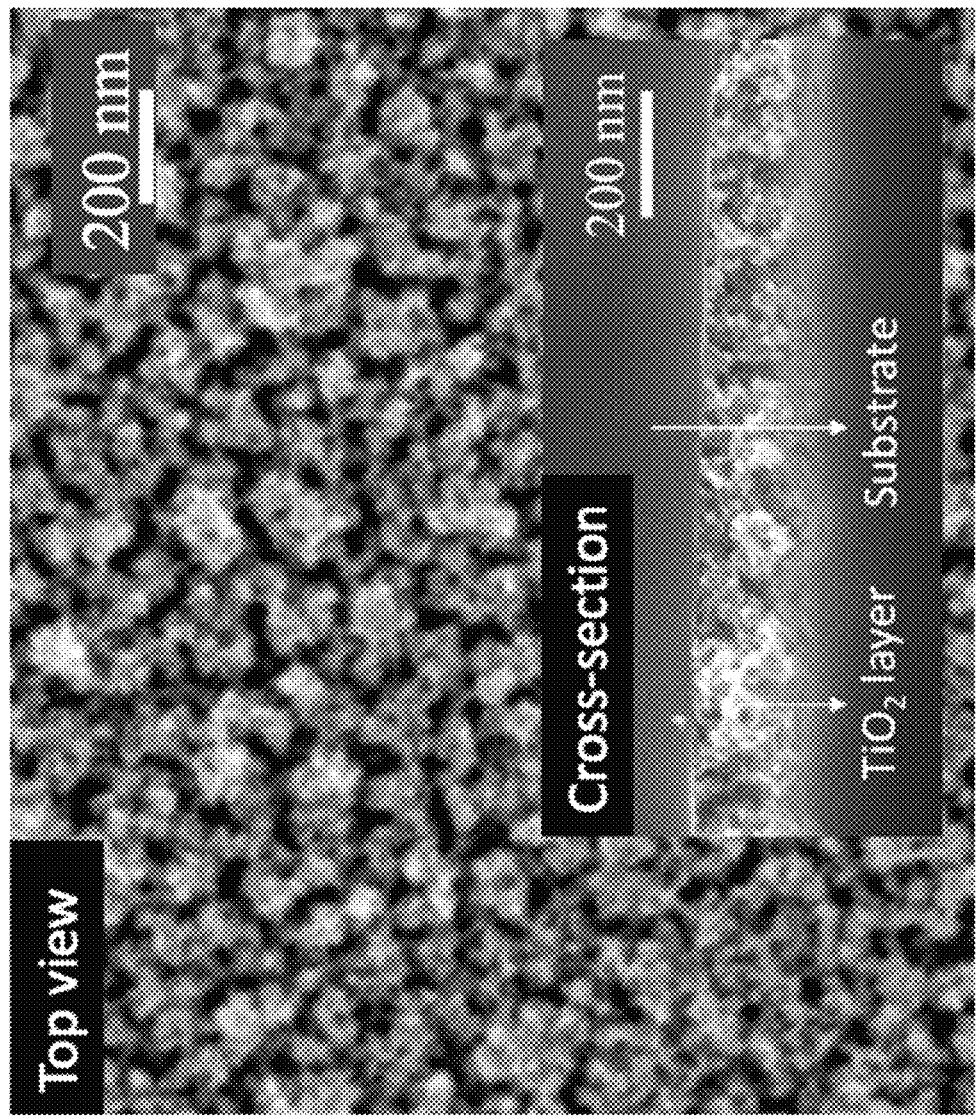
FIG. 2 shows an scanning electron microscopy image of LBL $TiO_2$ films.
Figure 3:
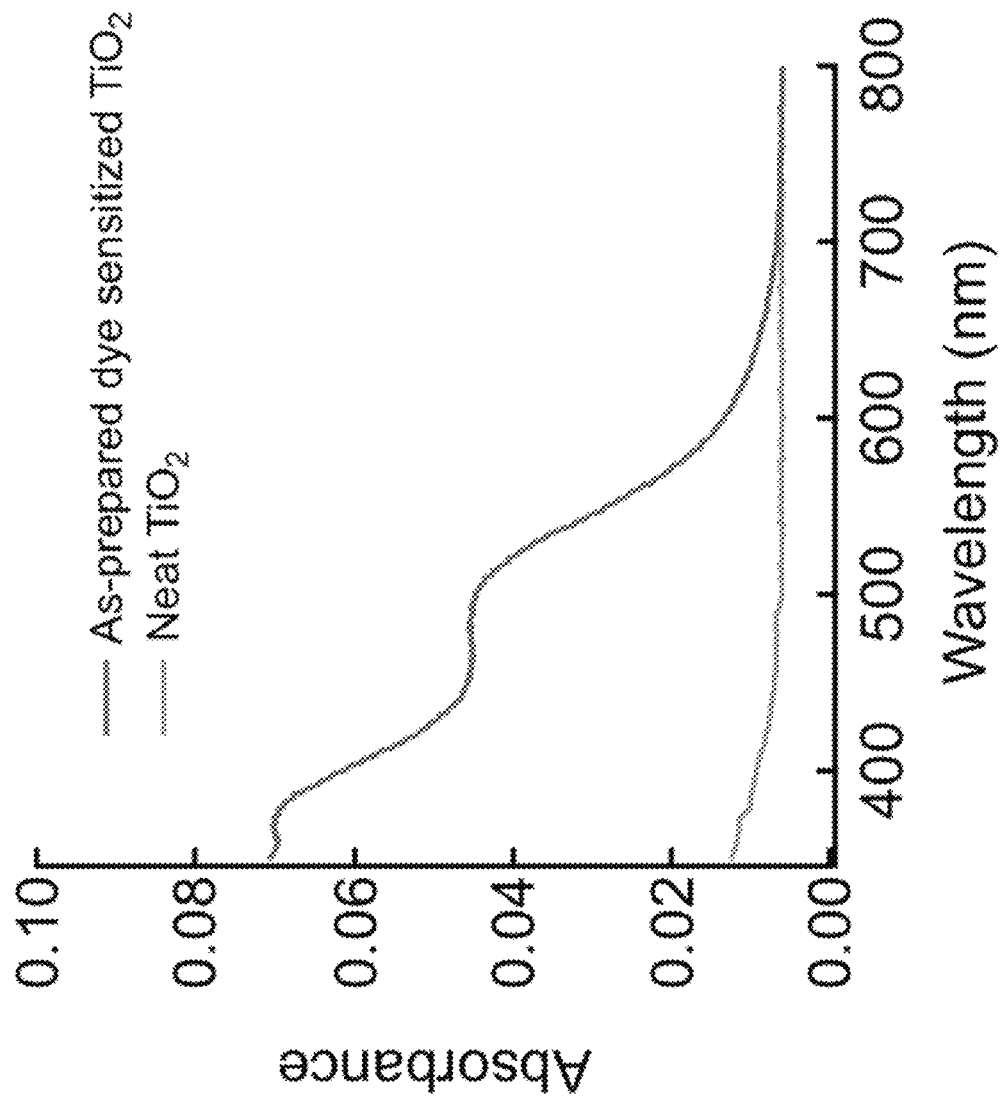
FIG. 3 shows UV-Visible absorbance data of as-prepared dye-sensitized $TiO_2$ surface and a neat $TiO_2$ surface.
Figure 4:
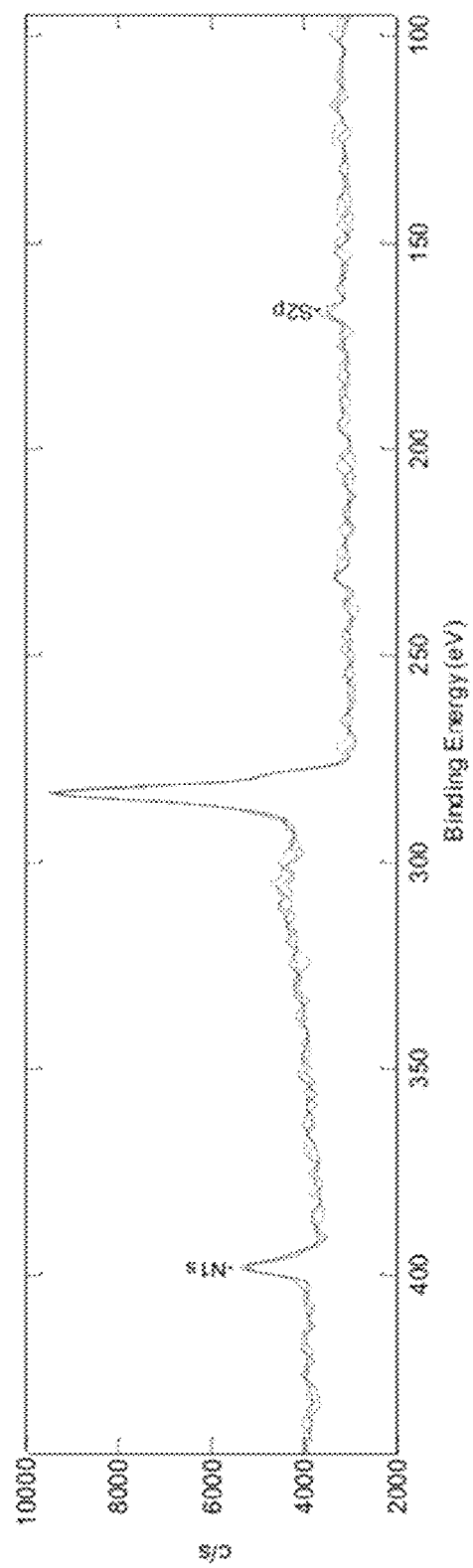
FIG. 4 shows the XPS spectrum of dye-sensitized $TiO_2$ surface.

LBL deposition technique was utilized to fabricate $TiO_2$ surfaces (FIG. 1). Here glass slides obtained from VWR were used as substrates where $TiO_2$ films were deposited. The glass slide is first washed with DI water. Then it is treated with oxygen plasma for 10 min to remove any contaminants present on the glass slide surface and to endow negative surface charge on the surface. Here $TiO_2$ nanoparticles serve as the negative species while a positive polyelectrolyte, poly(allylamine hydrochloride) (PAH, Mw=58,000 Da) obtained from Sigma-Aldrich is used as the positive species. The coating solutions containing $TiO_2$ nanoparticles (average diameter=20±5 nm) and PAH are prepared in a solvent of deionized water. Concentrations for both solutions were maintained at 0.03 wt % and 1 mg/mL, respectively. The pH for both solutions were adjusted to 9.0±0.1 and 7.5±0.1, respectively. The substrate was dipcoated in the prepared LBL solutions by using an automated machine (Nanostrata Inc.). Since LBL process used a polyelectrolyte as intermediate layers between the $TiO_2$ layers, it was necessary to remove this organic content. In order to remove PAH layers, the substrate was calcined at 400° C. for 2 hours. The prepared $TiO_2$ surfaces are nanoporous with ~150 nm thickness (FIG. 2).

Example 2

A thin, nanostructured $TiO_2$ surface was fabricated using layer-by-layer (LBL) deposition either on an indium tin oxide (ITO) coated glass slide (Sigma Aldrich, surface resistivity=8-12 Ω/sq) or stainless steel mesh (TWP Inc., pore size 2 μm) substrates. First, the substrates were thoroughly rinsed with isopropyl alcohol and DI water followed by drying with nitrogen gas. The cleaned substrates were sequentially dip-coated in poly(allylamine hydrochloride) (PAH) (Sigma Aldrich, average molecular weight=15,000 g/mol) aqueous solution (1 mg/mL, pH=7.5) and $TiO_2$ nanoparticle (Svaya Nanotechnology, average diameter 20 nm) aqueous dispersion (0.03 wt %, pH=9.0). After depositing 30 bilayers of PAH and $TiO_2$, the substrates were calcined at 400° C. for 2 hours to remove PAH from the surface. A scanning electron microscopy (SEM) image shows that the surface is highly porous (see inset (i) in FIG. 6A).

Dye Sensitization

Example 1

N3 (cis-Bis(isothiocyanato) bis(2,2'-bipyridyl-4,4'-dicarboxylato) ruthenium(II)) was used for sensitization. First the dye was dissolved in ethanol at a concentration of 0.3 mM. The substrate was immersed into the dye solution for 12 hours at room temperature followed by washing with copious amounts of ethanol in order to remove excess dye. Dye molecules anchor on the $TiO_2$ surface via the —COOH groups, most likely in the form of carboxylate.

Figure 8C:
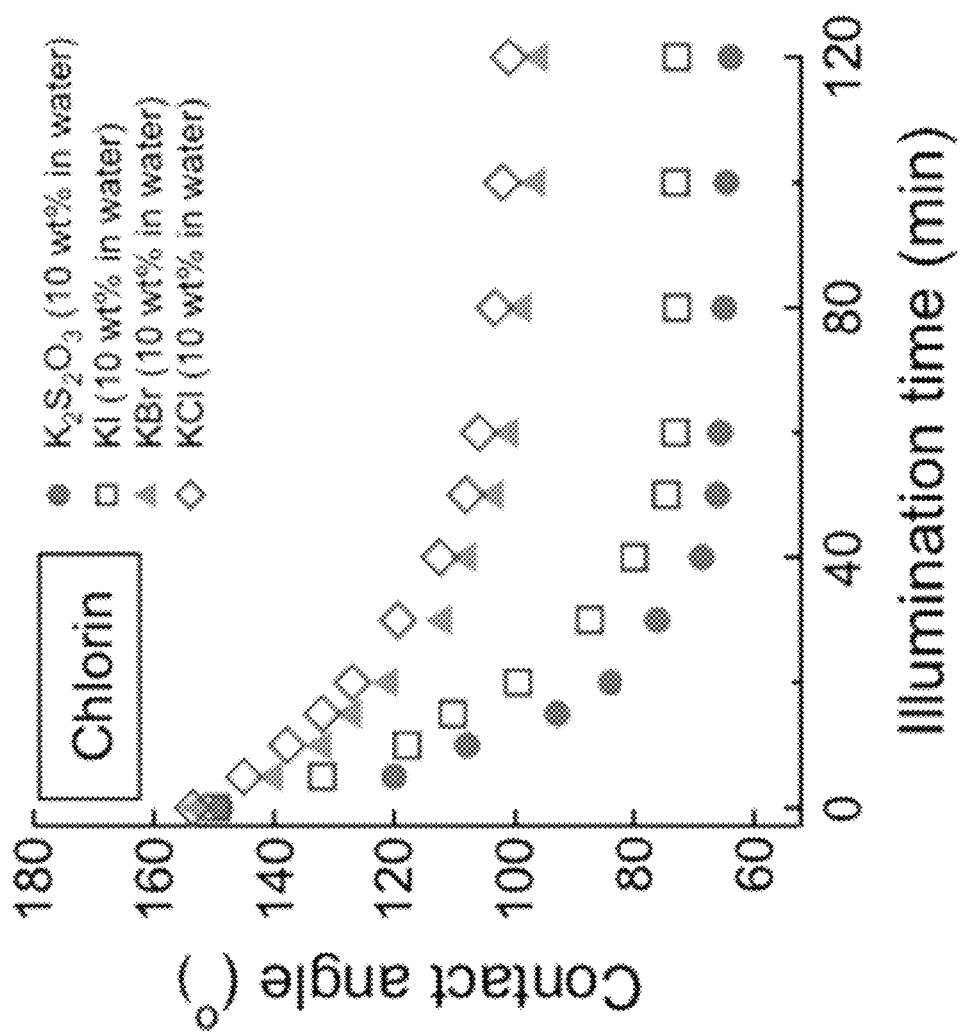

The UV-Visible absorption spectrum of prepared dye sensitized $TiO_2$ surface was measured between 350 and 800 nm (FIGS. 8A-8C). It absorbs visible light spectral region with wavelengths between 390 nm-650 nm. By contrast, a neat $TiO_2$ surface (i.e., without dye sensitization) exhibited negligible absorbance on the same spectral region. This clearly indicates that absorption of dye sensitized $TiO_2$ surfaces due to excitation of dye molecules. The composition of the surfaces was analyzed using XPS. FIGS. 9A-9E shows the N 1 s and S 2 p regions that reveal the presence of components from the dye. Further the atomic concentration ratio of N and S was found to be 3:1. This value is same as that of stoichiometric ratios for nitrogen and sulfur in the dye molecule.

Example 2

Solutions (0.3 mM) of N3 dye (Sigma Aldrich), D149 dye (Sigma Aldrich) and Chlorin dye (Frontier Scientific) were prepared in anhydrous ethanol (Fischer Scientific). Note that N3 dye, D149 dye and Chlorin dye denote cis-bis(isothiocyanato) bis(2,2'-bipyridyl-4,4'-dicarboxylato ruthenium (II), 5-[[4-[4-(2,2-diphenylethenyl)phenyl]-1,2,3,3a,4,8b-hexahydrocyclopent[b]indol-7 yl]methylene]-2-(3-ethyl-4-oxo-2-thioxo-5-thiazolidinylidene)-4-oxo-3-thiazolidineacetic acid and 13-carboxy-17-(2-carboxyethyl)-15-carboxymethyl-17,18-trans-dihydro-3-vinyl-8-ethyl-2,7,12, 18 tetramethylporphyrin, respectively. Small pieces of substrates with $TiO_2$ surface were dip-coated in the desired solution for 12 hours followed by thorough rinsing with ethanol to remove any residual dye molecules from the surface. The substrates were then dried with nitrogen gas.

In Situ Contact Angle Measurements Under Visible Light Illumination

A small volume (=4 μl) of ionic aqueous droplet was placed onto a dye-sensitized $TiO_2$ surface submerged in dodecane. Visible light (MI 150, Edmund Optics) was irradiated from the top of the droplet. Note that the intensity of the light was constant (I=145 mW/cm$^2$) in all measurements. The contact angle measurements were conducted using a Ramé-Hart 590-F1 goniometer.

Fabrication of a Patterned Dye-Sensitized $TiO_2$ Surface

A glass slide was masked in a channel (5 mm wide×15 mm long) by Kapton polyimide adhesive tape (ULINE) by manual application. A $TiO_2$ film was prepared on the unmasked region using LBL deposition followed by calcination as described above. Subsequently the substrate was dip-coated in a Chlorin dye solution for 12 hours to obtain a Chlorin dye-sensitized $TiO_2$ channel. The channel was then masked by attaching a cross-linked polydimethylsiloxane (x-PDMS) film. The substrate was treated with heptadecafluoro-1,1,2,2-tetrahydrodecyl trichlorosilane (Gelest) by vapor phase deposition at 90° C. for 1 hour to obtain hydrophobic background.

Demulsification of a Brine-in-Dodecane Emulsion

A brine-in-dodecane emulsion (30:70 v:v) was prepared by mixing water with 10 wt % sodium chloride (NaCl) and dodecane using a stir bar at 1000 rpm. The concentration of Span80 surfactant was 0.1 wt % to dodecane phase. The emulsion is added onto a stainless steel mesh coated with a Chlorin dye-sensitized $TiO_2$ film which is sandwiched between the two vertical glass tubes. After addition of emulsion, visible light is illuminated onto the mesh surface to induce coalescence of brine droplets.

Switching Wettability Upon Irradiation of Visible Light

In order to study the wettability switch of the fabricated surfaces, the substrate was immersed in oil and irradiated with visible light to observe the water contact angle change. Wettability changes under irradiation of UV or visible light were studied typically by measuring water contact angles in air. In the present example, however, water contact angles were measured in oil environments for two reasons. First, measurements of water contact angles in air are subject to the uncertainties which arise from intrinsic hydrophilicity of dye sensitized surfaces. Second, water drop evaporates during measurements due to a heat generation from visible light source. In order to avoid those limitations, water contact angles were measured in oil environments. Here octane was chosen as a representative oil because it has a low surface tension which leads to higher contact angles for water. Also it is immiscible with water.

Figure 5:
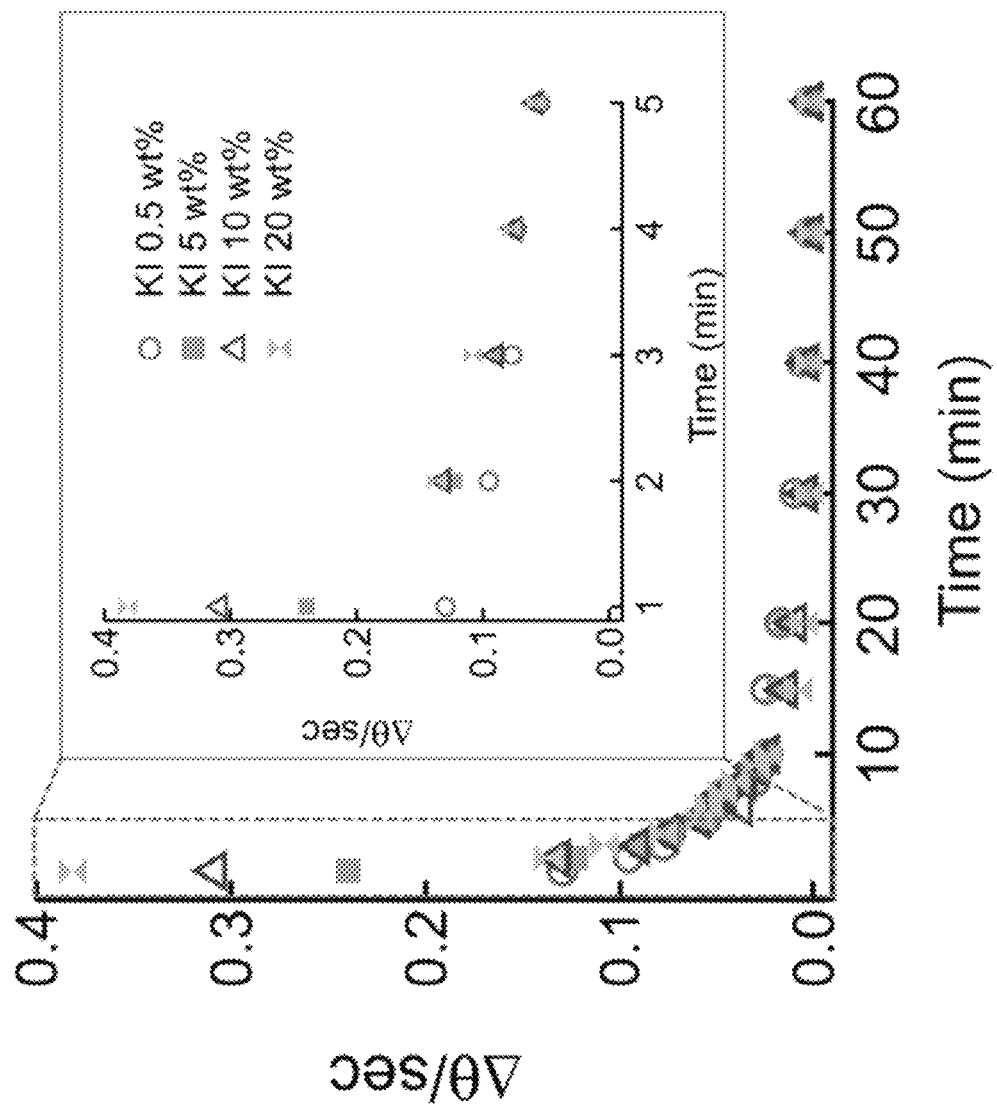
FIG. 5 shows rates of decrease in contact angles for potassium iodide (KI) solutions at different concentrations as a function of visible light irradiation time.

A drop of DI water of size 3 μL was inserted carefully on the surface immersed in oil. The initial contact angle for water is 121°±1°. Visible light was irradiated on the surface at a distance on 5 mm above a drop of water. After 60 min of irradiation, the contact angle decreased gradually and reached 115°. This result suggests that the surface alters wettability upon irradiation of visible light. investigated visible light-induced wettability switch was investigated using different liquids. Potassium iodide (KI) aqueous solution (10 wt %) was chosen as a representative electrolyte. Upon irradiation of visible light, rapid decrease in contact angles was observed in a short period of time (~5 min). After 60 min, the contact reached a value of 62°. Contact angles for KI solutions were also measured with different concentrations (0.5 wt %, 5.0 wt % and 20 wt %) under visible light irradiation. Rates of decrease in contact angles increases with increasing concentration of KI (FIG. 5).

Estimation of the Ratio of Total Surface Area Per Unit Projected Area

The ratio of the total inner surface area per unit surface area was estimated. The absorbance of N3 dye-sensitized $TiO_2$ surface at 478 nm is 0.1736 (see FIG. 6A). The extinction coefficient of N3 dye at 478 nm is $e_{478\ nm}=1.88\ 10^7\ cm^2\ mol^{-1}$. The dye concentration on the surface can be calculated by dividing the absorbance with the extinction coefficient. This yields $9.23\ 10^{-9}\ mol\ cm^{-2}$. Considering that each dye molecule occupies an area of 1 $nm^2$, the inner surface area is 56 $cm^2$ for each 1 $cm^2$ projected area. See, Nazeeruddin, M. K., Liska, P., Moser, J., Vlachopoulos, N. & Grätzel, M., *Helv. chim. Acta* 73, 1788-1803 (1990), which is incorporated by reference in its entirety.

Figure 10:
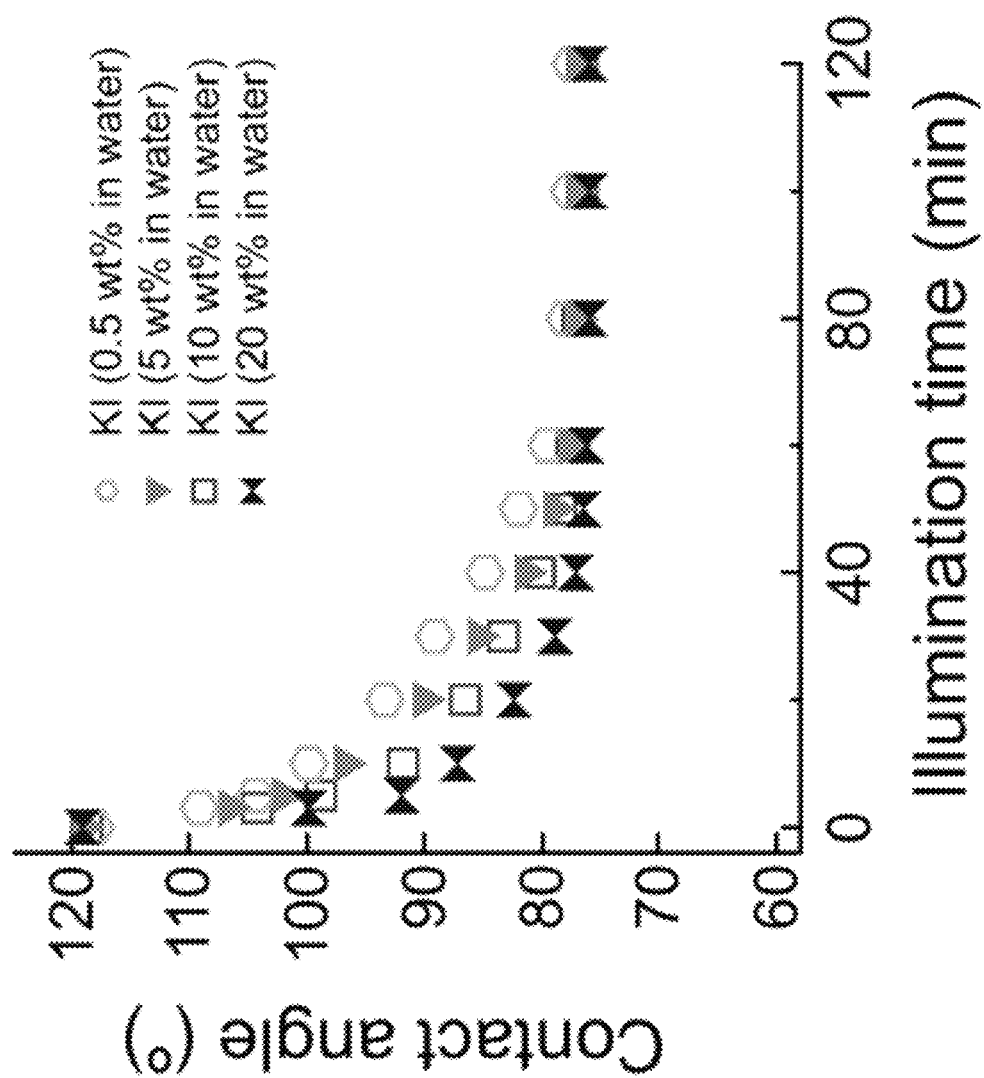
FIG. 10 shows evolution in the measured contact angles for potassium iodide (KI) droplets with various ionic concentrations on an N3 dye-sensitized $TiO_2$ surface as a function of illumination time.

Measured Contact Angles for KI and KCl Droplets with Various Concentrations on an N3 Dye-Sensitized $TiO_2$ Surface Under Visible Light Illumination Contact angles were measured for aqueous KI and KCl droplets with a range of different concentrations on an N3 dye-sensitized $TiO_2$ surface upon visible light illumination. FIG. 10 shows the contact angles for KI droplets with 0.5 wt %, 5 wt %, 10 wt % and 20 wt % as a function of illumination time (intensity=145 $mW/cm^2$). It shows that KI droplets with higher ionic concentration exhibited rapid decrease in the contact angles under optical illumination. On the other hand, the contact angles for KCl droplets remained almost unchanged during illumination and this negligible change in the contact angles was found to be independent of ionic concentration (see Table 1).

TABLE 1

Measured contact angles for potassium chloride (KCl) droplets with various concentrations on an N3 dye-sensitized $TiO_2$ surface before and after illumination for 120 min.

| | 0.5 wt % KCl | 5 wt % KCl | 10 wt % KCl | 20 wt % KCl |
|---|---|---|---|---|
| $\theta_{KCl}^*$ (t = 0) | 120.6° | 120.9° | 121.2° | 121.6° |
| $\theta_{KCl}^*$ (t = 120 min) | 119.2° | 119.1° | 119.9° | 119.2° |
| $\Delta\theta^*$ (=$\theta_{t=0}^*$ − $\theta_{t=120\ min}^*$) | 1.4° | 1.8° | 1.3° | 2.4° |

X-Ray Photoelectron Spectroscopy (XPS) Analysis of the N3 Dye-Sensitized $TiO_2$ Surface after Visible Light Illumination To verify that the surface chemistry of the N3 dye-sensitized $TiO_2$ surface remains unaffected after visible light illumination, XPS measurements were conducted using a PHI 5600 ESCA multi-detection system with a base pressure of $1\times10^{-10}$ Torr. The X-ray radiation was the monochromatic Al Kα line (1486.7 eV); the X-ray spot size and the take-off angle were 0.8 mm and 45°, respectively.

Figure 11:
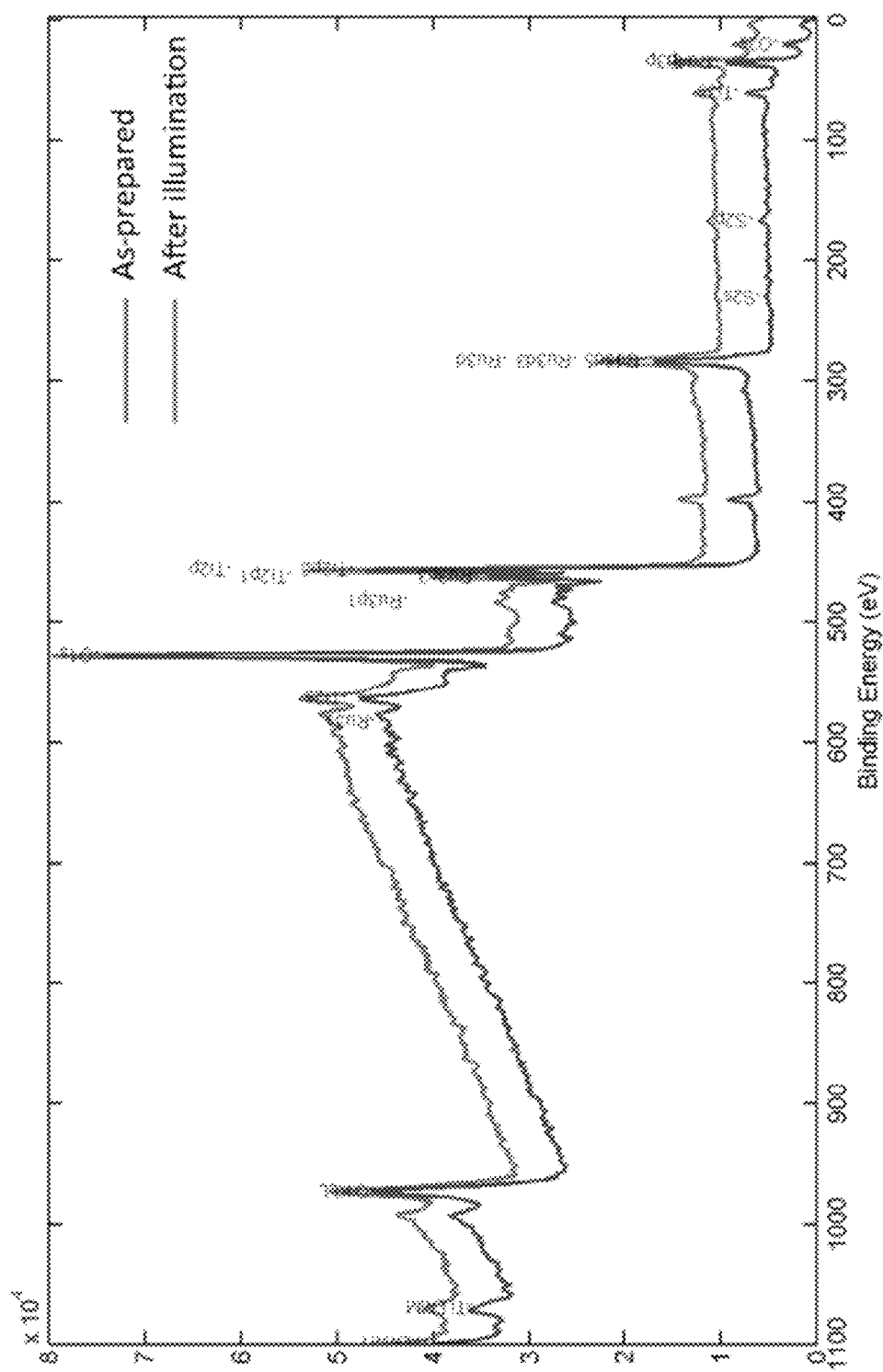
FIG. 11 shows survey XPS spectra of an N3 dye-sensitized $TiO_2$ surface before and after multiple wetting cycles under visible light illumination.

The survey spectra of the N3 dye-sensitized $TiO_2$ before and after multiple cycles of wetting under visible light illumination are shown in FIG. 11. The photoelectron peaks in the spectra can be attributed to titanium (Ti), oxygen (O), sulfur (S) and ruthenium (Ru). The origin of ruthenium and sulfur is due to N3 dye molecules adsorbed on the $TiO_2$ surface. The surface compositions were obtained by normalizing the area under the curve. The atomic concentration ratio of titanium (Ti2p) and ruthenium (Ru3d) of the N3 dye-sensitized $TiO_2$ surface remained unchanged (72.1:27.9, atomic %:atomic %) even after multiple cycles of wetting under visible light illumination. This indicates that the N3 dye-sensitized $TiO_2$ surface is robust against optical illumination.

Prediction of Voltages Between the Contacting Liquid Droplets and the N3 Dye-Sensitized $TiO_2$ Surfaces As discussed above, the electrolytic double layer formed at the liquid-solid interface under incident illumination can be considered as a capacitor. The time-dependent voltages was predicted by assuming that the capacitor is discharged over time. When a capacitor is discharged in an RC circuit, the voltage decays exponentially over time which is characterized by $V(t)\propto\exp[-(t/\tau_d)]$, where $\tau_d$ is the relaxation time constant. This can describe the voltages well when a capacitor (or a resistor) is perfect. Here this electrolytic double layer may not be a perfect capacitor. This is a reasonable assumption because the dye-sensitized $TiO_2$ surface possesses nanometric pores contacting oil (dodecane) phase which leads to the increase its resistive characteristic. When such an 'imperfect' capacitor is discharged, the voltage can be characterized by a stretched exponential function, $V(t)\propto\exp[-(t/\tau_d)^\alpha]$, where α (0<α≤1) is the fractional derivative order (see also equation (1)). When α=1, the stretched exponential is reduced to the simple exponential. Equation (1) was used to predict the voltages between the KI (or KCl) droplet and the surface. The measured voltages match well with equation (1) with $\tau_d$=130 sec and α=0.42 for KI droplet and $\tau_d$=11.5 sec and α=0.988 for KCl droplet, respectively.

Figure 12:
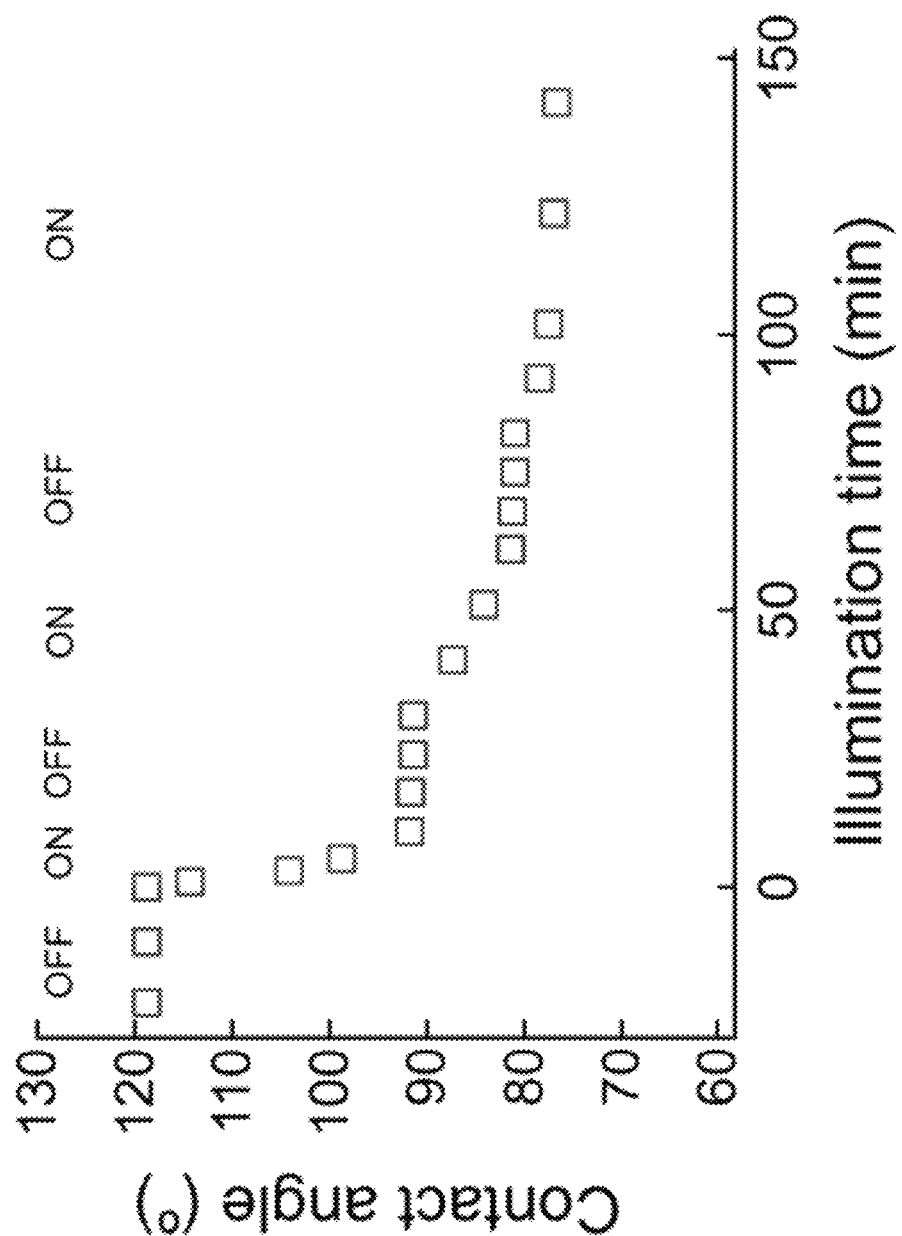
FIG. 12 shows evolution in the measured contact angles for a KI droplet (10 wt % in water) on an N3 dye-sensitized $TiO_2$ surface upon intermittent visible light illumination.

Measured Contact Angles for a KI Droplet on an N3 Dye-Sensitized $TiO_2$ Surface Upon Intermittent Visible Light Illumination The contact angles for a KI droplet (10 wt % in water) were measured on an N3 dye-sensitized $TiO_2$ surface upon intermittent visible light illumination. FIG. 12 shows the contact angles for a KI droplet as a function of illumination time (intensity=145 $mW/cm^2$). The contact angle decreases progressively from $\theta^*_{KI,\ t=0}$=119° after the onset of illumination and reaches $\theta^*_{KI,t=10\ min}$=92° at t=10 min. When the illumination is turned off at t=10 min, the contact angle changes halt instantaneously and the contact angle remains unchanged. When the illumination is turned on at t=30 min, the contact angle starts to decrease. The illumination is again turned off at t=60 min and the contact angle was found to be almost constant ($\theta^*_{KI,\ t=60\ min}\approx\theta^*_{KI,\ t=90\ min}\approx$81°) in the absence of optical illumination. The contact angle starts to decrease after the onset of illumination at t=90 min and finally approaches $\theta^*_{KI,\ t=160\ min}$=76°.

Figure 13:
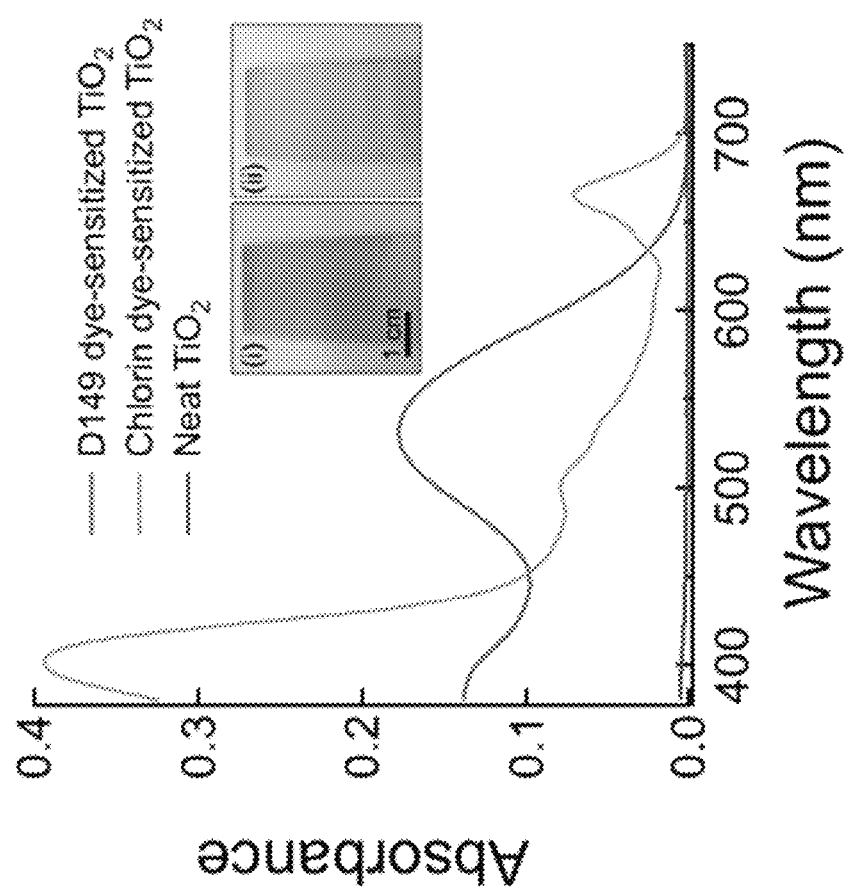
FIG. 13 shows visible light absorption data of a D149 dye-sensitized $TiO_2$ surface and a Chlorin dye-sensitized $TiO_2$ surface. Corresponding absorption data of an unsensitized neat $TiO_2$ surface is also shown for comparison. Insets: (i) A photograph of a D149 dye-sensitized $TiO_2$ surface and (ii) a photograph of a Chlorin dye-sensitized $TiO_2$ surface.

Visible Light Absorbance Data of a D149 Dye-Sensitized $TiO_2$ Surface and a Chlorin Dye-Sensitized $TiO_2$ Surface Two different dye-sensitized $TiO_2$ surfaces were fabricated utilizing D149 dye and Chlorin dye. Adsorption of D149 dye molecules leads to a light-red coloration of the surface (see inset (i) in FIG. 13). A Chlroin dye sensitized $TiO_2$ surface exhibits light-green color (see inset (ii) in FIG. 13). FIG. 13 shows the absorption spectra of a D149 dye-sensitized $TiO_2$ surface and a Chlorin dye-sensitized $TiO_2$ surface. It is evident that both surfaces absorb a broad range of visible spectrum (390 nm 700 nm).

Measured Voltages Between the Contacting Liquid Droplets and Dye-Sensitized $TiO_2$ Surfaces The in-situ voltages established were measured across the contacting liquids and the dye-sensitized $TiO_2$ surfaces. Here four different ionic aqueous droplets ($K_2S_2O_3$, KI, KBr and KCl, all concentrations are 10 wt % in water) were used as probe contacting liquids.

Figure 14A:
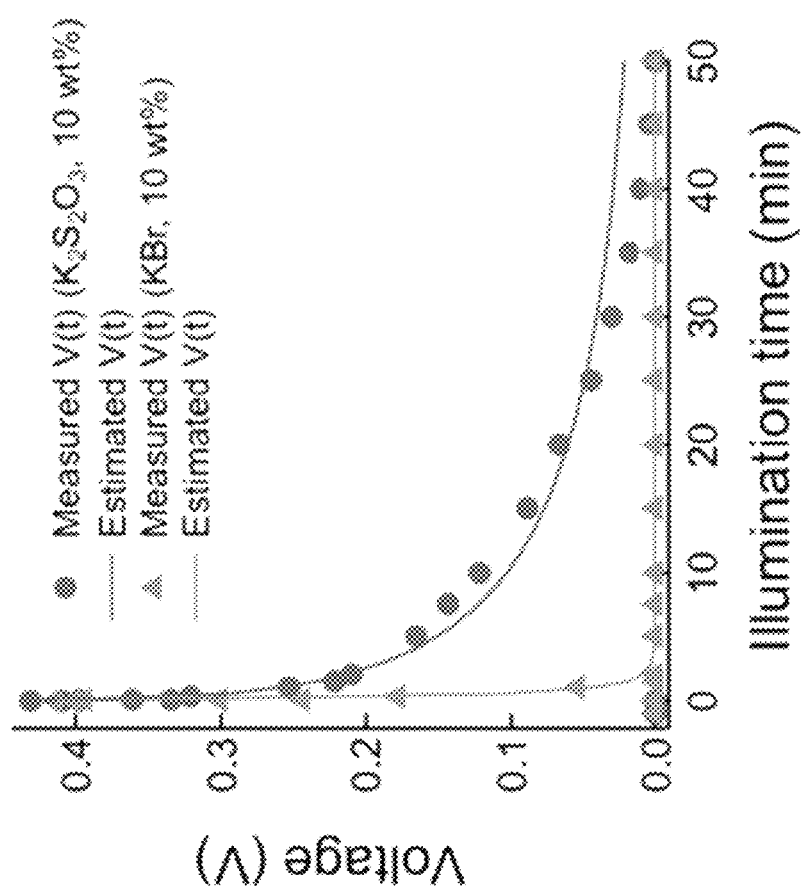
FIG. 14A shows a plot of measured voltages across the contacting liquids ($K_2S_2O_3$ and KBr) on the N3 dye-sensitized $TiO_2$ surface under visible light illumination.

(i) N3 Dye-Sensitized $TiO_2$ Surface:

FIG. 14A shows the measured voltages across the contacting liquids ($K_2S_2O_3$ and KBr) and the N3 dye-sensitized $TiO_2$ surface while illuminating with visible light. The intensity of visible light is 145 $mW/cm^2$ for all measurements. Immediately after the onset of illumination, a potential difference ($V_{K_2S_2O_3, t=0}$=0.43 V and $V_{KBr, t=0}$=0.41 V) is observed. While the voltage gradually decreases between the $K_2S_2O_3$ droplet and the surface over time, a rapid decrease in the voltage was observed between the KBr droplet and the surface. This is because bromide ($Br^-$) cannot effectively reduce the oxidized N3 dye as its reduction potential is higher (more positive) than the HOMO energy level of the N3 dye. The measured voltages between the $K_2S_2O_3$ droplet and ITO match well with equation (1) with $\tau_d$=271 sec and $\alpha$=0.45 (see FIG. 14A and Table 2). The measured voltages between the KBr droplet and the surface can be well described with $\tau_d$=20.6 sec and $\alpha$=0.76 (see FIG. 14A).

Figure 14B:
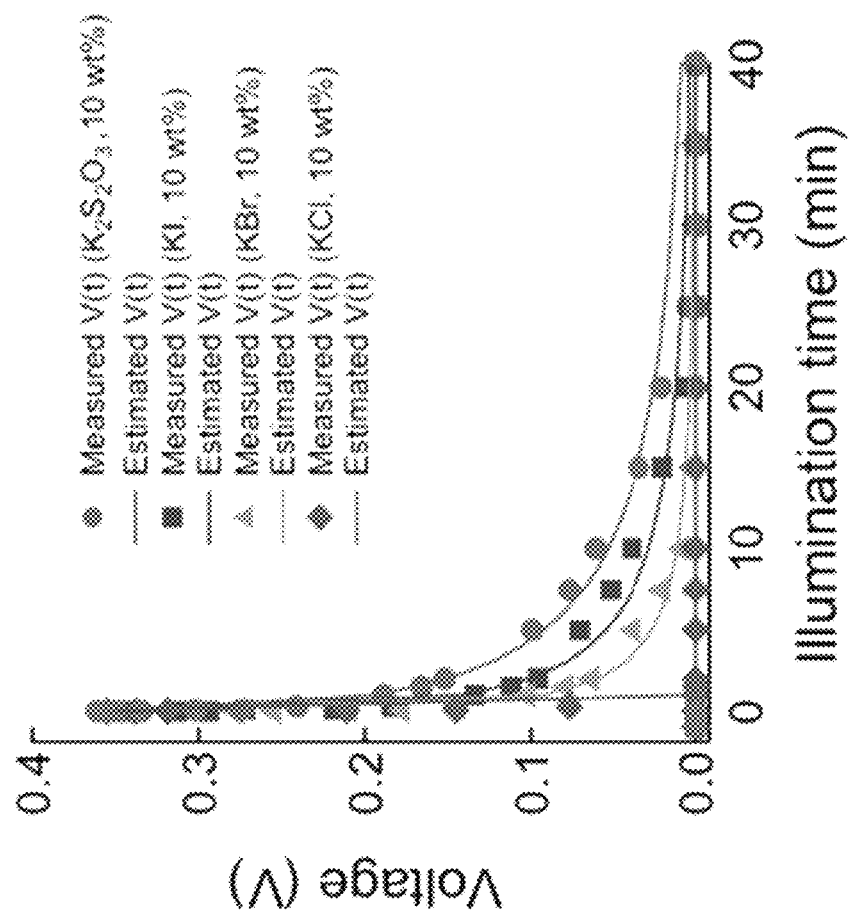
FIGS. 14B and 14C plots of measured voltages across the contacting liquids ($K_2S_2O_3$, KI, KBr and KCl) on the D149 dye-sensitized $TiO_2$ surface and Chlorin dye-sensitized $TiO_2$ surface, respectively, under visible light illumination.

(ii) D149 Dye-Sensitized $TiO_2$ Surface:

FIG. 14B shows the measured in-situ voltages between the contacting liquids and the D149 dye-sensitized $TiO_2$ surface. After a potential difference ($V_{t=0}$≈0.355 V) is established for all contacting liquids upon the onset of optical illumination, a gradual decrease in the voltage is observed for $K_2S_2O_3$, KI and KBr. It is noteworthy that the KBr droplet exhibited a prolonged voltage difference on a D149 dye-sensitized $TiO_2$ surface in contrast to a rapid decrease on an N3 dye-sensitized $TiO_2$ surface (see FIG. 14A). This is because the HOMO energy level of a D149 dye is lower (less positive) than the reduction potential of bromide which allows for regeneration process of oxidized D149 $dye^2$. In contrast, the measured voltage between the KCl droplet and the surface decreases rapidly and reaches zero within a minute of illumination. As expected, this is because the reduction potential of chloride is higher (more positive) than the HOMO energy level of D149 dye which hinders effective regeneration of oxidized dye). Equation (1) describes the measured voltages well with various values of $\tau_d$ and $\alpha$ (see Table 2).

Figure 14C:
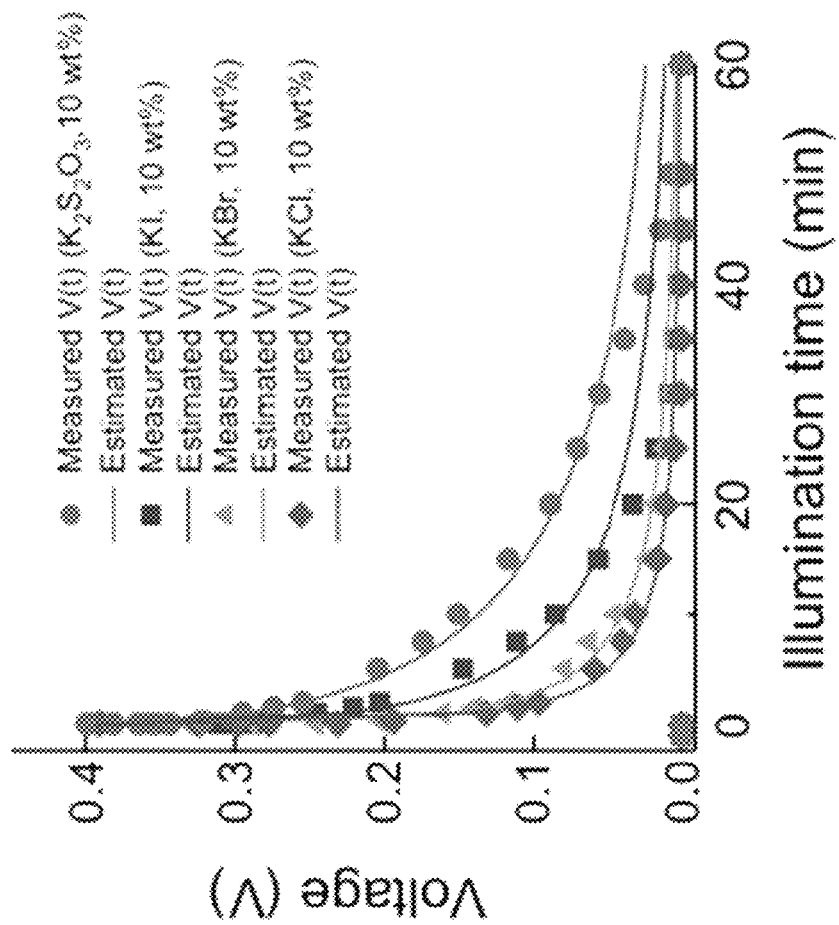

(iii) Chlorin Dye-Sensitized $TiO_2$ Surface:

FIG. 14C shows the measured in-situ voltages across the contacting liquids and the Chlorin dye-sensitized $TiO_2$ surface. As the HOMO energy level of a Chlorin dye is higher (more positive) than the reduction potential of all contacting liquids ($K_2S_2O_3$, KI, KBr and KCl), voltages for all contacting liquid droplets decrease gradually with increasing illumination time. This leads to spreading of all contacting liquids including KCl droplets (FIG. 8C).

Table 2 lists the values of $\tau_d$ and $\alpha$ found in the voltage predictions using the fractional RC circuit model.

TABLE 2

The values of $\tau_d$ and $\alpha$ found in the voltage predictions using the fractional RC circuit model.

| | | $\tau_d$ (sec) | $\alpha$ |
|---|---|---|---|
| N3 dye-sensitized $TiO_2$ | $K_2S_2O_3$ | 271 ± 43 | 0.45 ± 0.044 |
| | KI | 130 ± 24 | 0.42 ± 0.042 |
| | KBr | 20.6 ± 9.4 | 0.76 ± 0.28 |
| | KCl | 11.5 ± 4.8 | 0.988 ± 0.432 |
| D149 dye-sensitized $TiO_2$ | $K_2S_2O_3$ | 156.9 ± 25 | 0.48 ± 0.05 |
| | KI | 75 ± 19.7 | 0.437 ± 0.064 |
| | KBr | 29.9 ± 10.8 | 0.41 ± 0.079 |
| | KCl | 8.4 ± 4.3 | 0.98 ± 0.53 |
| Chlorin dye-sensitized $TiO_2$ | $K_2S_2O_3$ | 530 ± 67 | 0.54 ± 0.053 |
| | KI | 216 ± 55 | 0.45 ± 0.0686 |

TABLE 2-continued

The values of $\tau_d$ and $\alpha$ found in the voltage predictions using the fractional RC circuit model.

| | $\tau_d$ (sec) | $\alpha$ |
|---|---|---|
| KBr | 76.6 ± 16.8 | 0.4 ± 0.044 |
| KCl | 50.7 ± 11.6 | 0.41 ± 0.049 |

Figure 15:
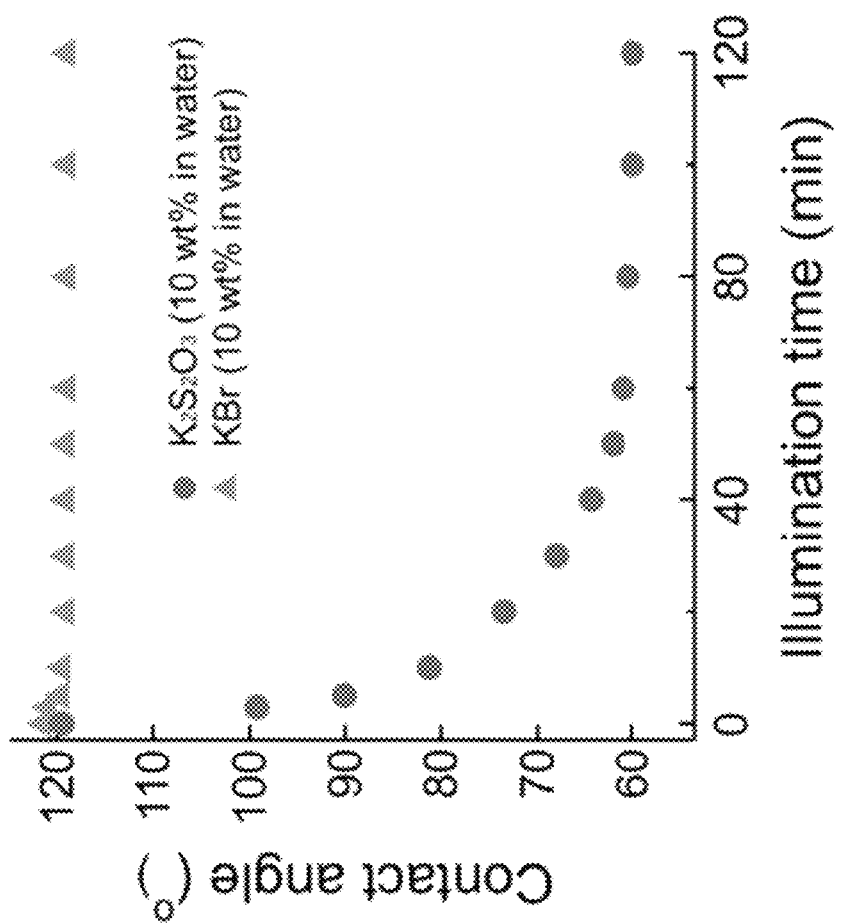
FIG. 15 shows evolution in the measured contact angles for potassium thiosulfate ($K_2S_2O_3$) and potassium bromide (KBr) droplets on an N3 dye-sensitized $TiO_2$ surface upon visible light illumination.

Measured Contact Angles for $K_2S_2O_3$ and KBr Droplets on an N3 Dye-Sensitized $TiO_2$ Surface Under Visible Light Illumination The in-situ contact angles were measured for two liquid droplets: $K_2S_2O_3$ and KBr (10 wt % in water) on an N3 dye-sensitized $TiO_2$ surface. FIG. 15 shows the evolution in the macroscopic contact angles for $K_2S_2O_3$ and KBr droplets as a function of illumination time (intensity=145 $mW/cm^2$). The contact angles for $K_2S_2O_3$ decrease from $\theta^*_{t=0}$=119° with increasing illumination time before it approaches $\theta^*_{t=120\ min}$=77° while those for KBr remain almost constant during illumination ($\Delta\theta^*\approx 2°$ where $\Delta\theta^*=*\theta^*_{t=0}-\theta^*_{t=120\ min}$).

Other embodiments are within the scope of the following claims.

What is claimed is:

1. An oil-water separation membrane comprising:
   a matrix including a plurality of particles, wherein the particle surface is modified with a photosensitizer, such that the wettability of the surface having a nanotexture changes upon irradiation with light and includes a multilayer including a plurality of bilayers, each bilayer comprising:
   a first layer including a polyelectrolyte polymer; and
   a second layer including the plurality of particles modified by the photosensitizer in contact with the first layer.

2. The surface of claim 1, wherein the plurality of particles include a metal oxide.

3. The surface of claim 2, wherein the metal oxide includes $TiO_2$, ZnO, $WO_3$, $SrTiO_3$, $SnO_2$, $V_2O_5$, $CeO_2$, CuO, $MoO_3$, $Fe_2O_3$, $Cr_2O_3$ or $In_2O_3$.

4. The surface of claim 2, wherein the particle is a nanoparticle.

5. The surface of claim 1, wherein the polyelectrolyte polymer includes poly(allylamine hydrochloride).

6. The surface of claim 1, wherein the photosensitizer includes Chlorin.

7. The surface of claim 1, wherein the photosensitizer includes a Ruthenium (II) polypyridyl complex.

8. The surface of claim 1, wherein the photosensitizer is N3, D149, Chlorin, Coumarin 343, Eosin Y, N719, N621, N179, N749, N945, Z907, Z907-Na, Z910, Z675, Z646, Z991, K8, K19, $K_2O$, K51, K60, K68, K73, K77, D5, D6, D102, D205, D29, D35, D37, DPP07, DPP13, DPP14, DPP15, DPP17, A1, A2, A3, A597, C101, C102, C217, CYC-B1, CYC-B3, CYC-B11, YS-1, YS-2, YS-3, YS-4, YS-5, YE05, Y123, YD2, YD2-o-C8, T18, T66, TFRS-1, TFRS-2, TFRS-3, HRS-1, SJW-E1, S8, JK-91, JK-92, LI17, HY2, DX1, SM371, SM315, RK1, NKX-2569, MB18-N, LEG4, DEK1, B18, D45, D51, D77, C106, N820, N823, N886, K9, N712, NKK-2553, NKK-2554, TG6, JF419, MKA253, L1, MK245, HSQ4, or P1.

9. The surface of claim 1, wherein the particles are covalently bonded to the photosensitizer.

10. The surface of claim 1, wherein the solid includes glass, fiber, stainless steel, inorganic materials or sand.

11. The surface of claim 10, wherein the solid portion of the solid-liquid interface is coated with indium tin oxide.

12. An oil-water separation device including a membrane, the membrane incorporating the surface of claim 1 the membrane incorporated into the oil-water separation device.

13. A method of separating oil from water in an oil-water mixture with the oil-water separation membrane of claim 1 comprising:
   contacting a surface of an oil-water separation membrane of claim 1 with the oil-water mixture; and
   irradiating the surface with light.

14. The method of claim 13, wherein the plurality of particles include a metal oxide.

15. The method of claim 14, wherein the metal oxide includes $TiO_2$, $ZnO$, $WO_3$, $SrTiO_3$, $SnO_2$, $V_2O_5$, $CeO_2$, $CuO$, $MoO_3$, $Fe_2O_3$, $Cr_2O_3$ or $In_2O_3$.

16. The method of claim 13, wherein the photosensitizer includes Chlorin.

17. The method of claim 13, wherein the photosensitizer includes a Ruthenium (II) polypyridyl complex.

18. A method of coating to make an oil water separation membrane of claim 1 comprising depositing on the polyelectrolyte polymer layer surface the matrix including the plurality of particles, wherein the surfaces of the particles are modified with a photosensitizer, wherein the wettability of the surface changes upon irradiation with light.

19. The method of claim 18, wherein the plurality of particles include a metal oxide.

* * * * *